Inventors.
Tommy A. Middlesworth
William H. Knapp
By Walter Greany Atty.

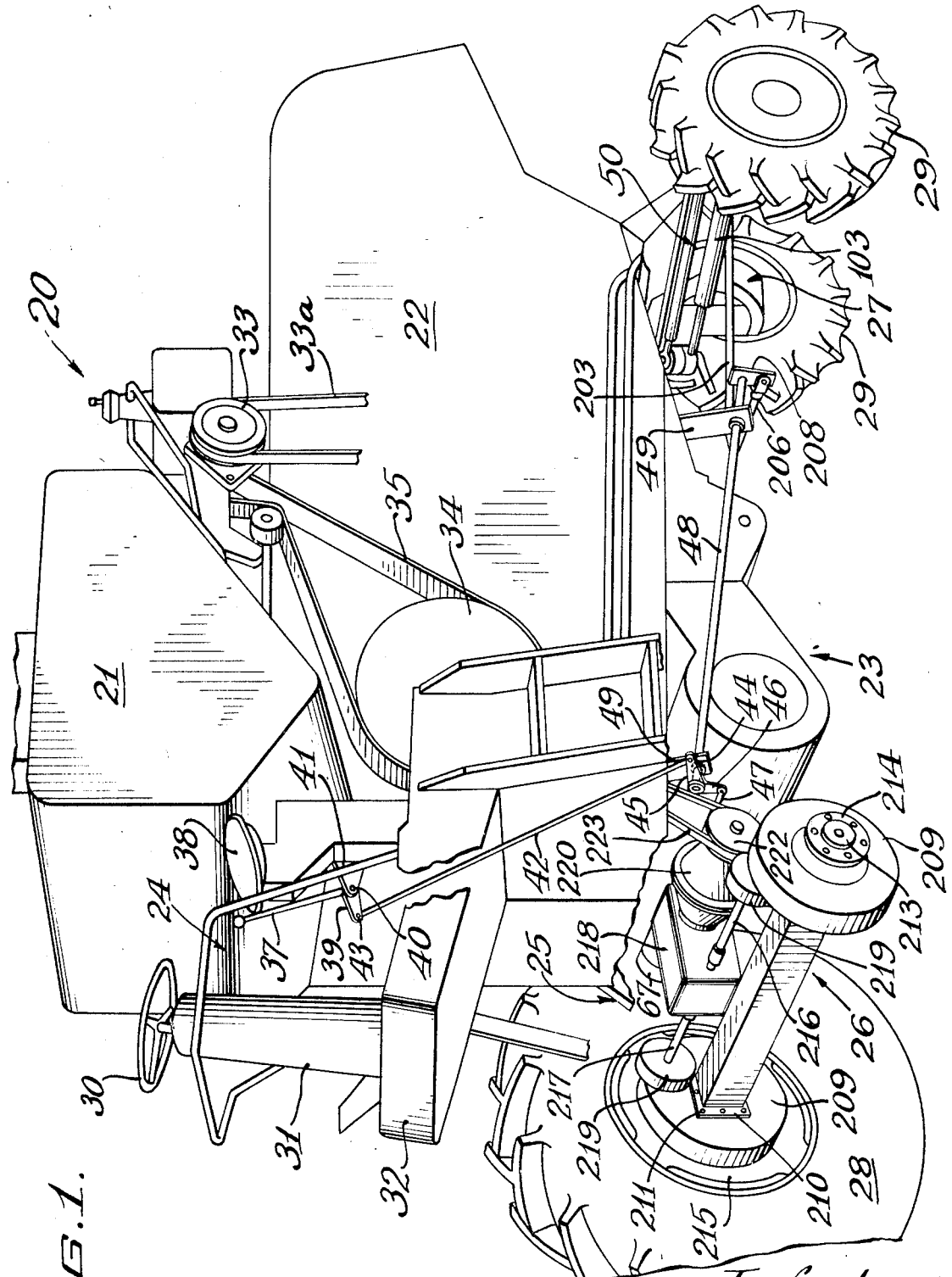

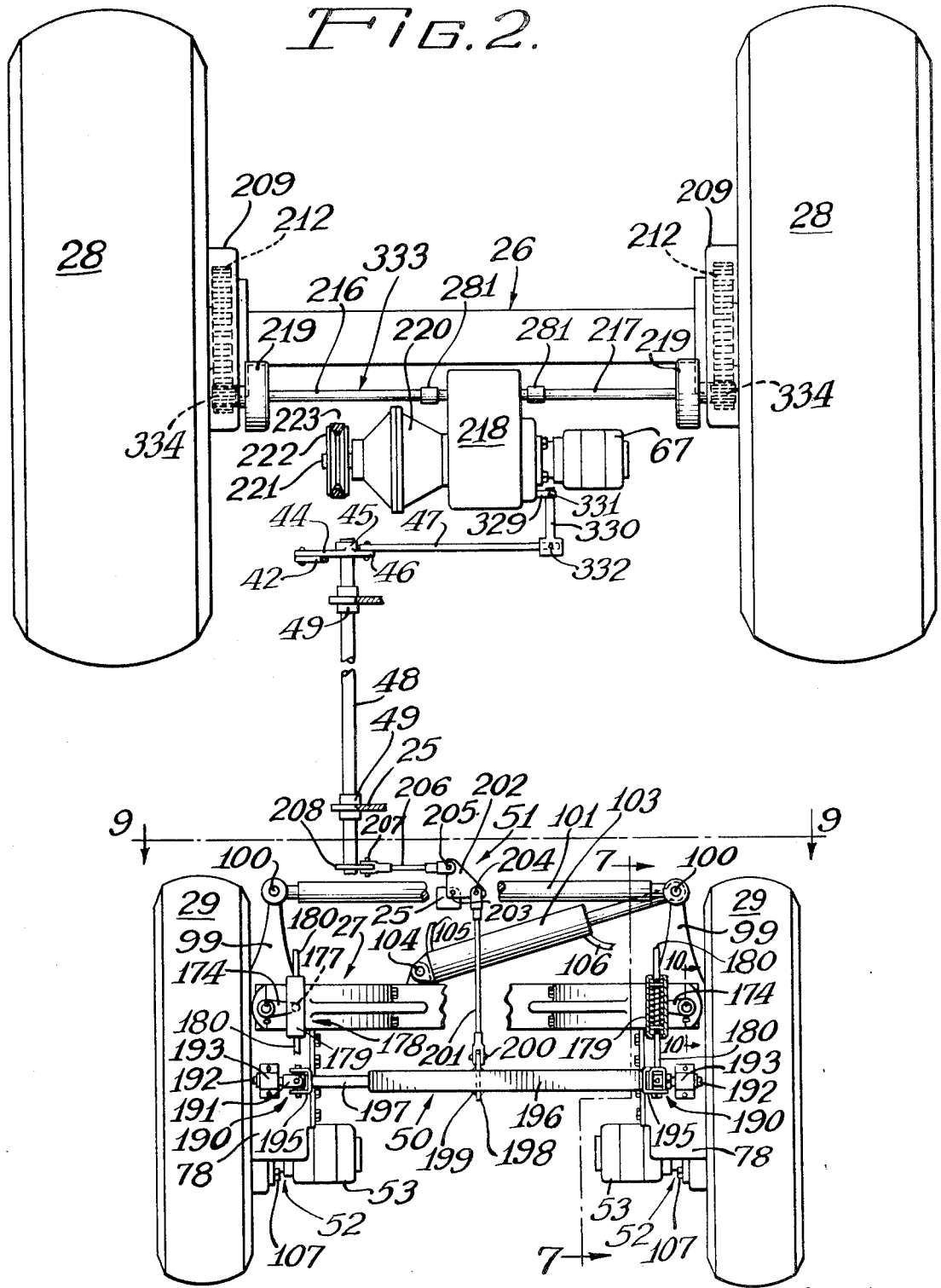

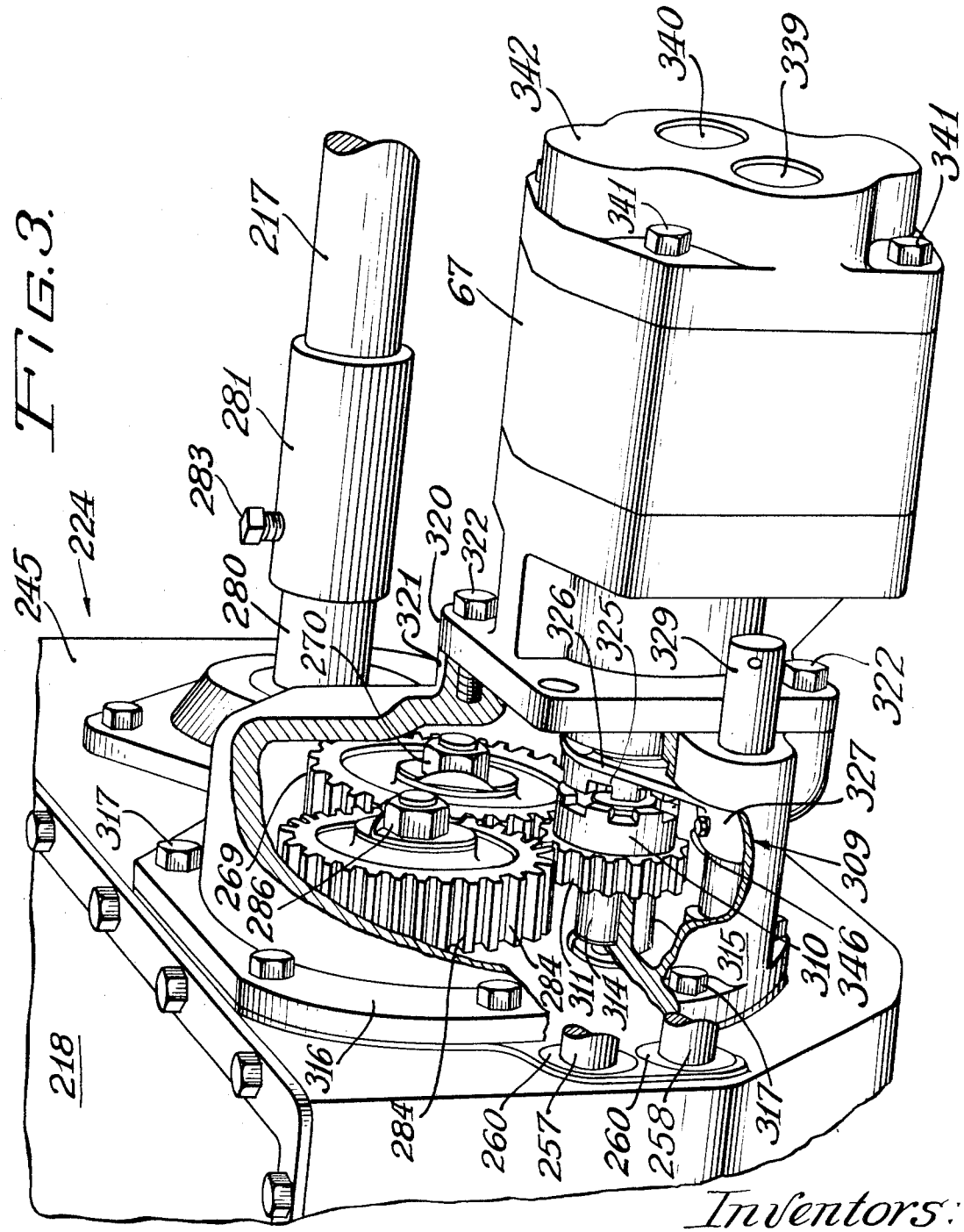

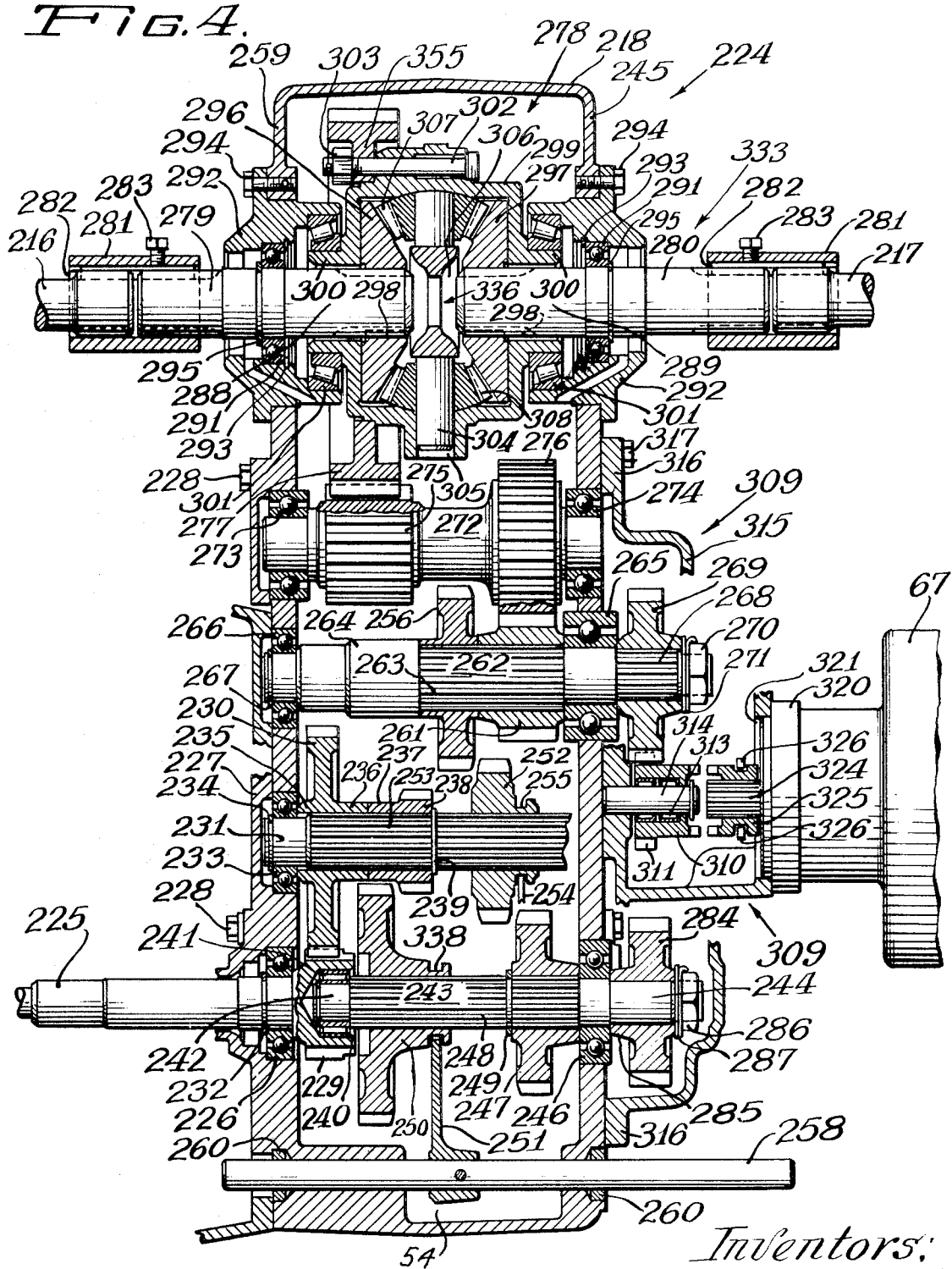

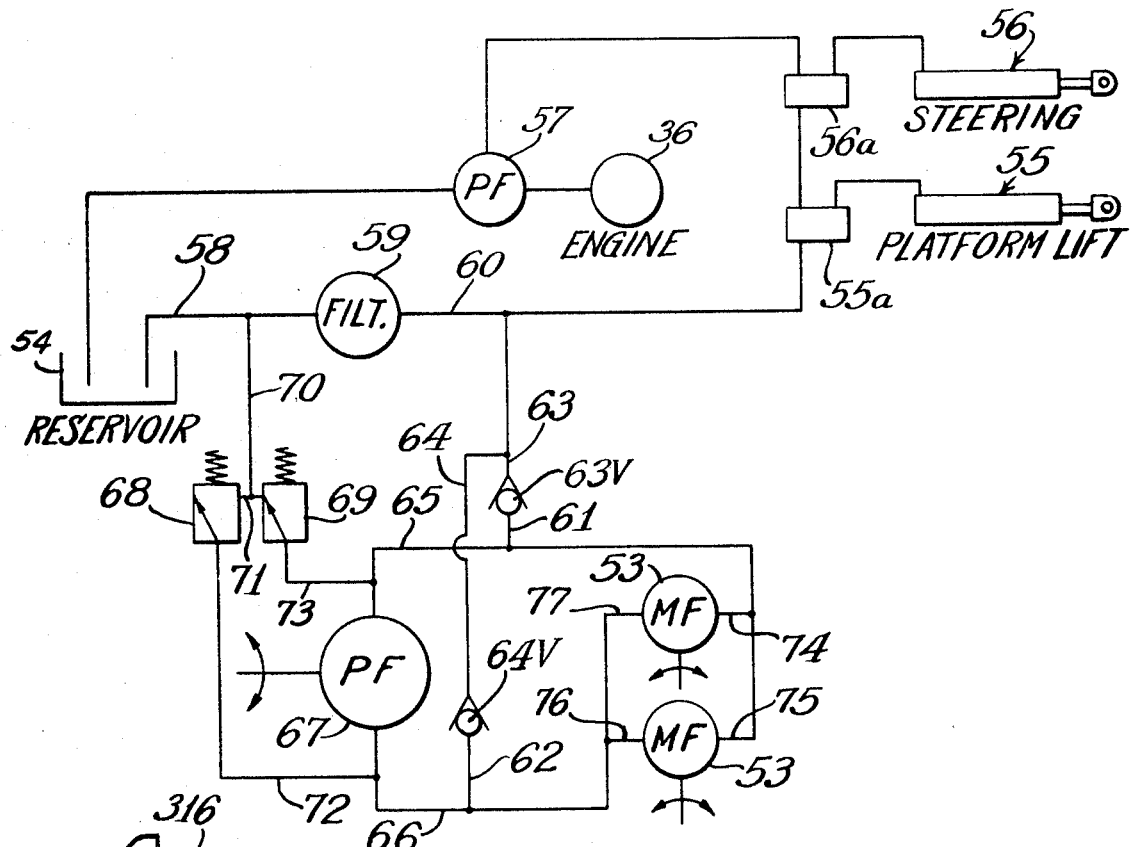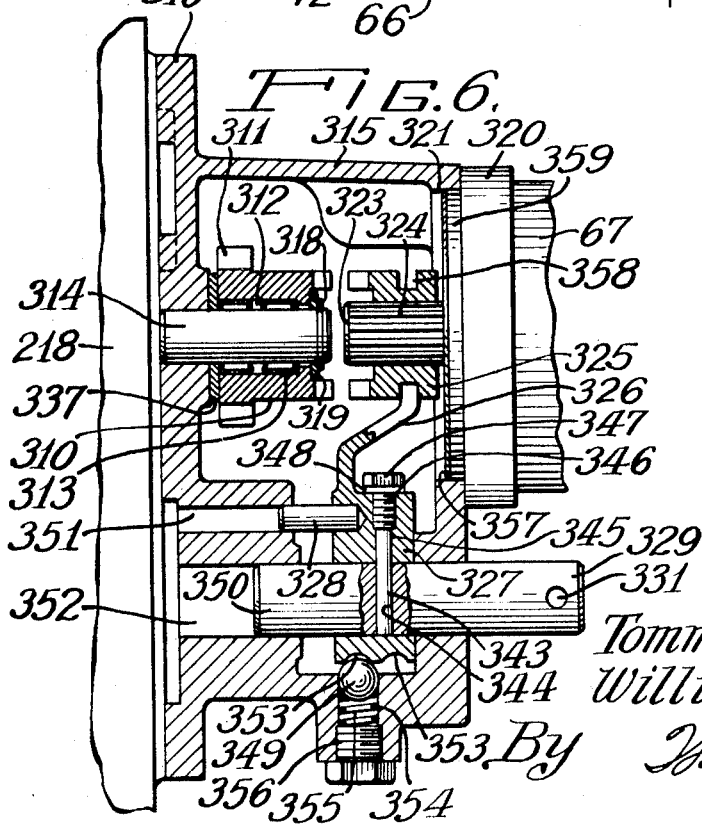

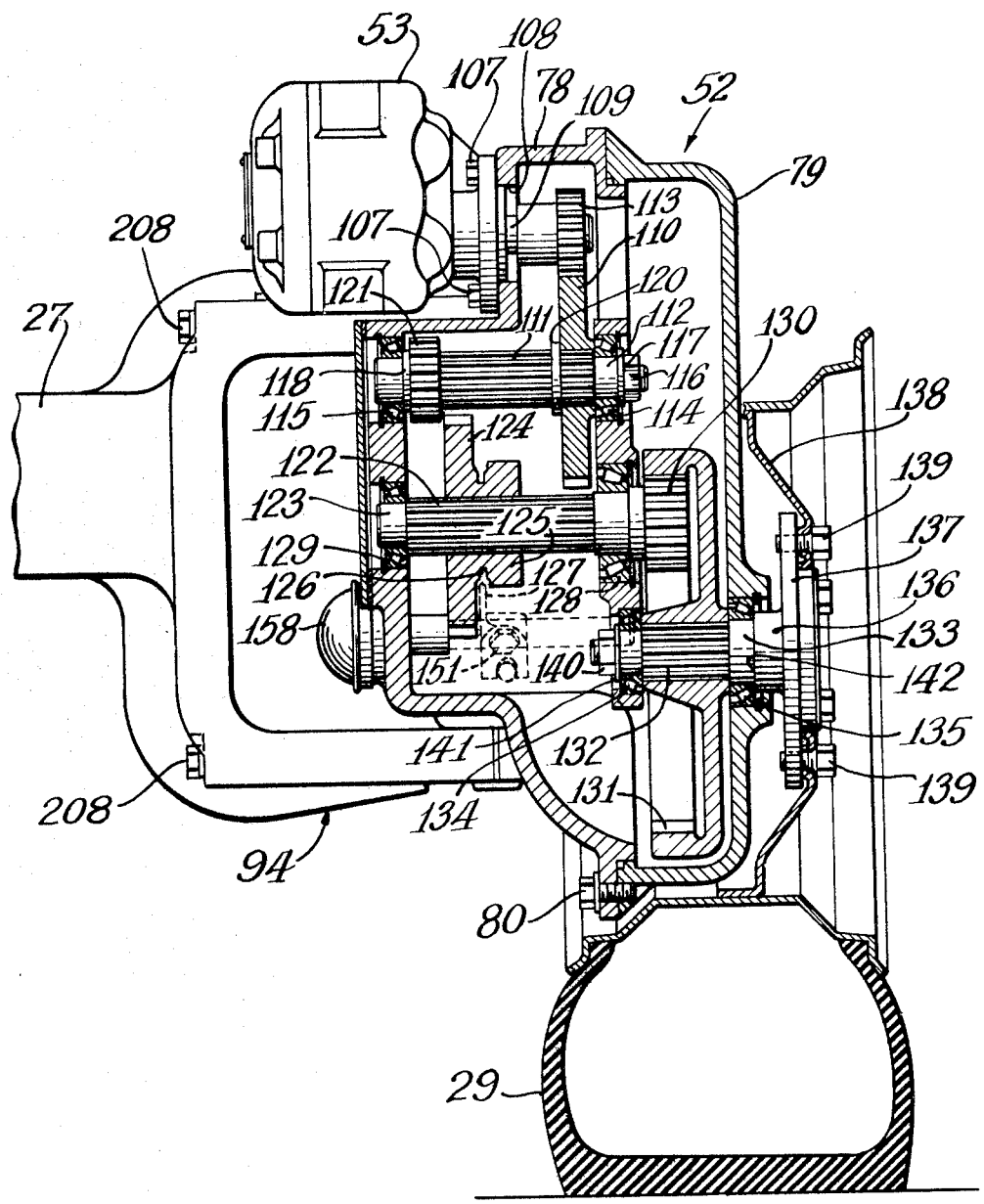

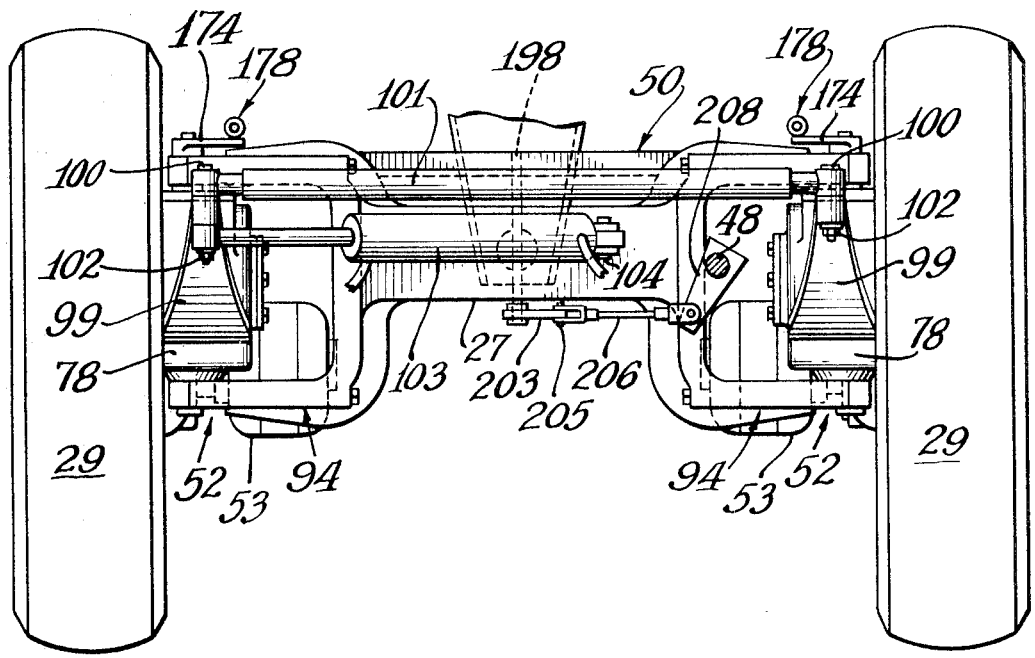
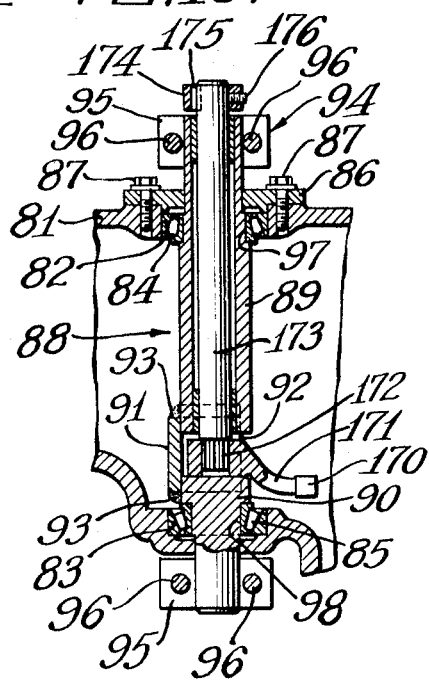
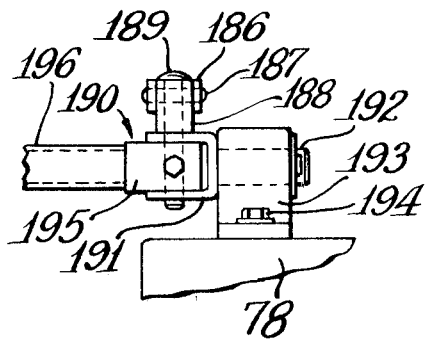

Aug. 4, 1970   T. A. MIDDLESWORTH ET AL   3,522,861
FOUR WHEEL DRIVE ATTACHMENT FOR COMBINES
Filed April 15, 1968                                12 Sheets-Sheet 9
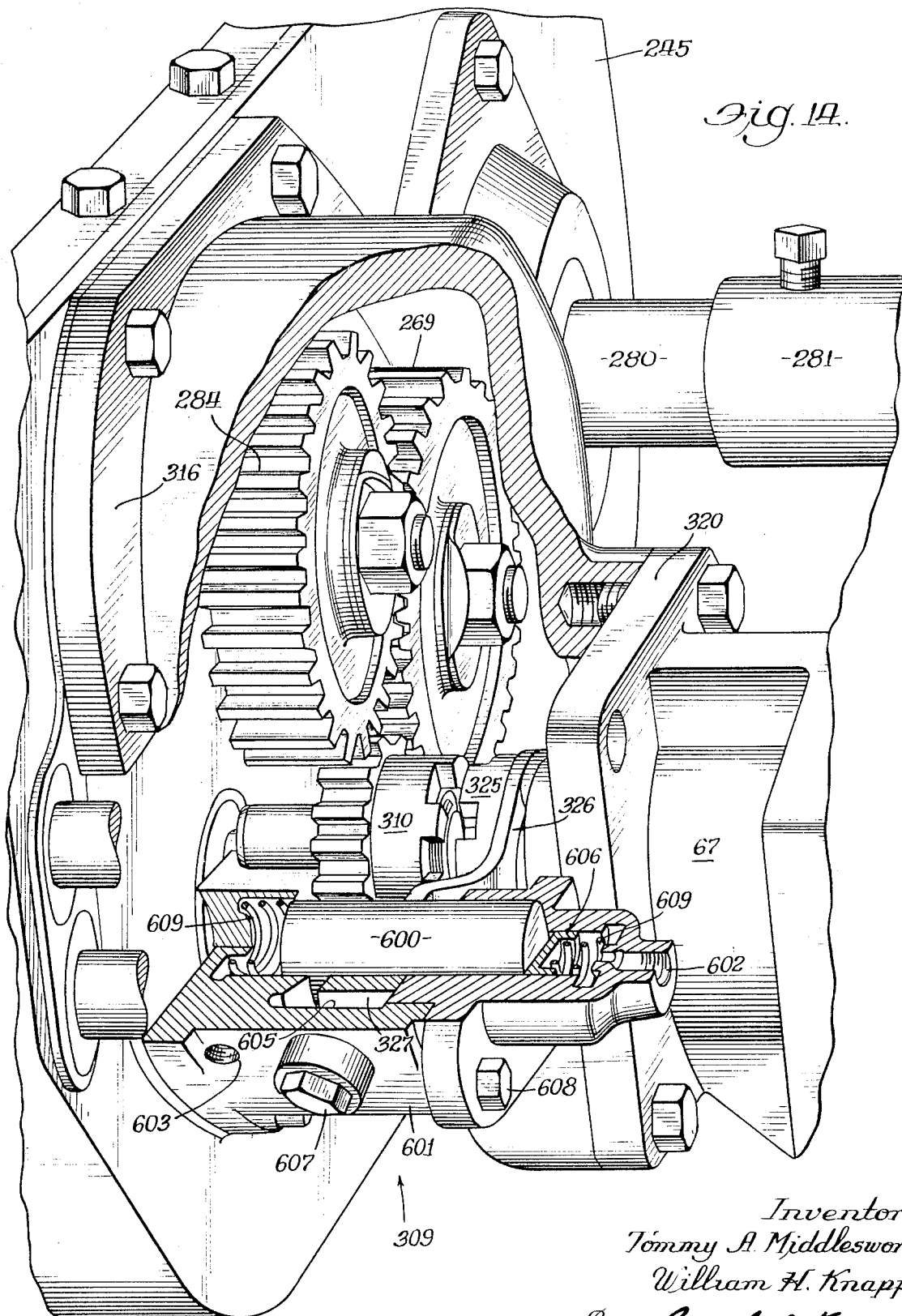
Inventors:
Tommy A. Middlesworth
William H. Knapp
By: Ronald C. Kamp
Atty.

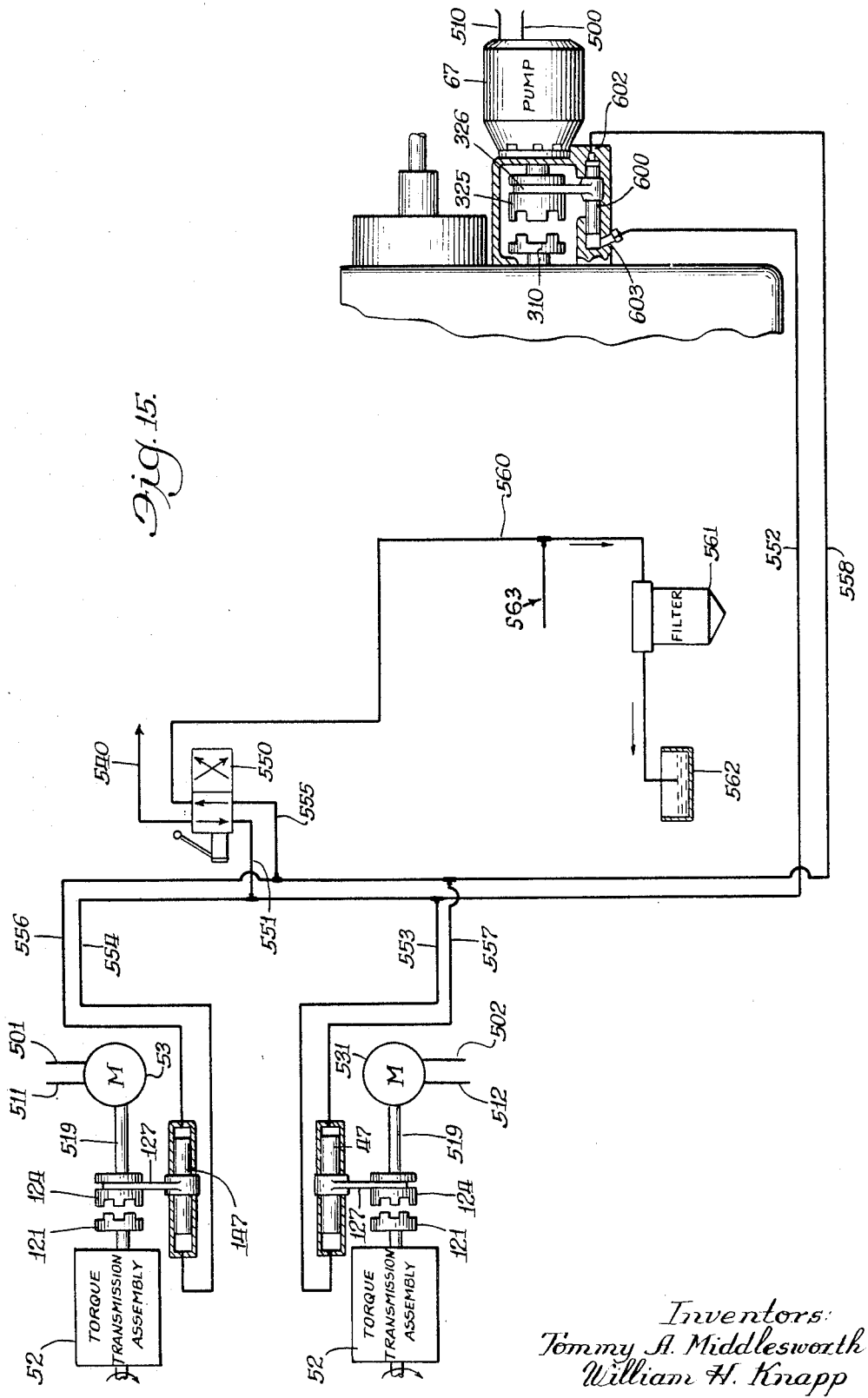

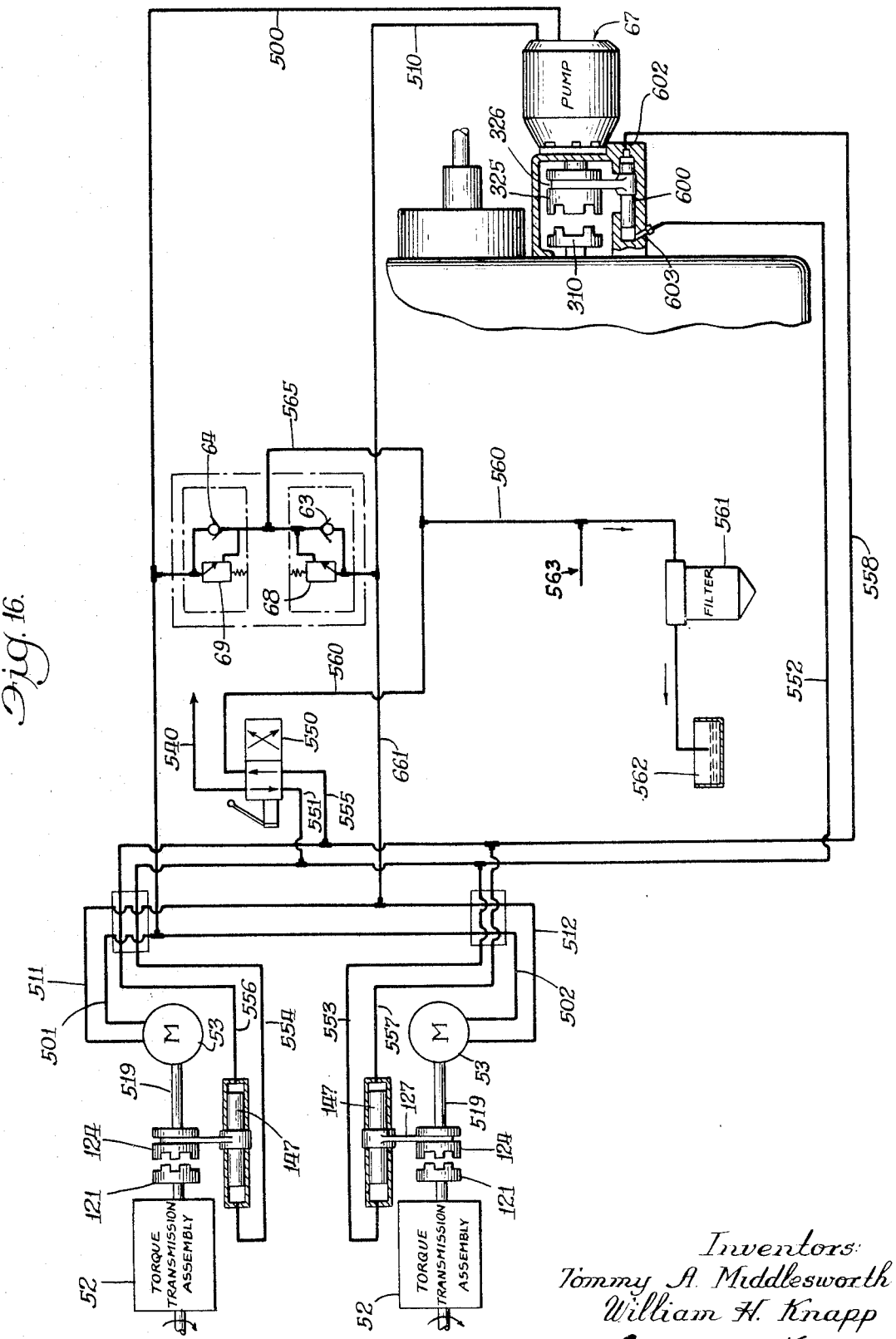

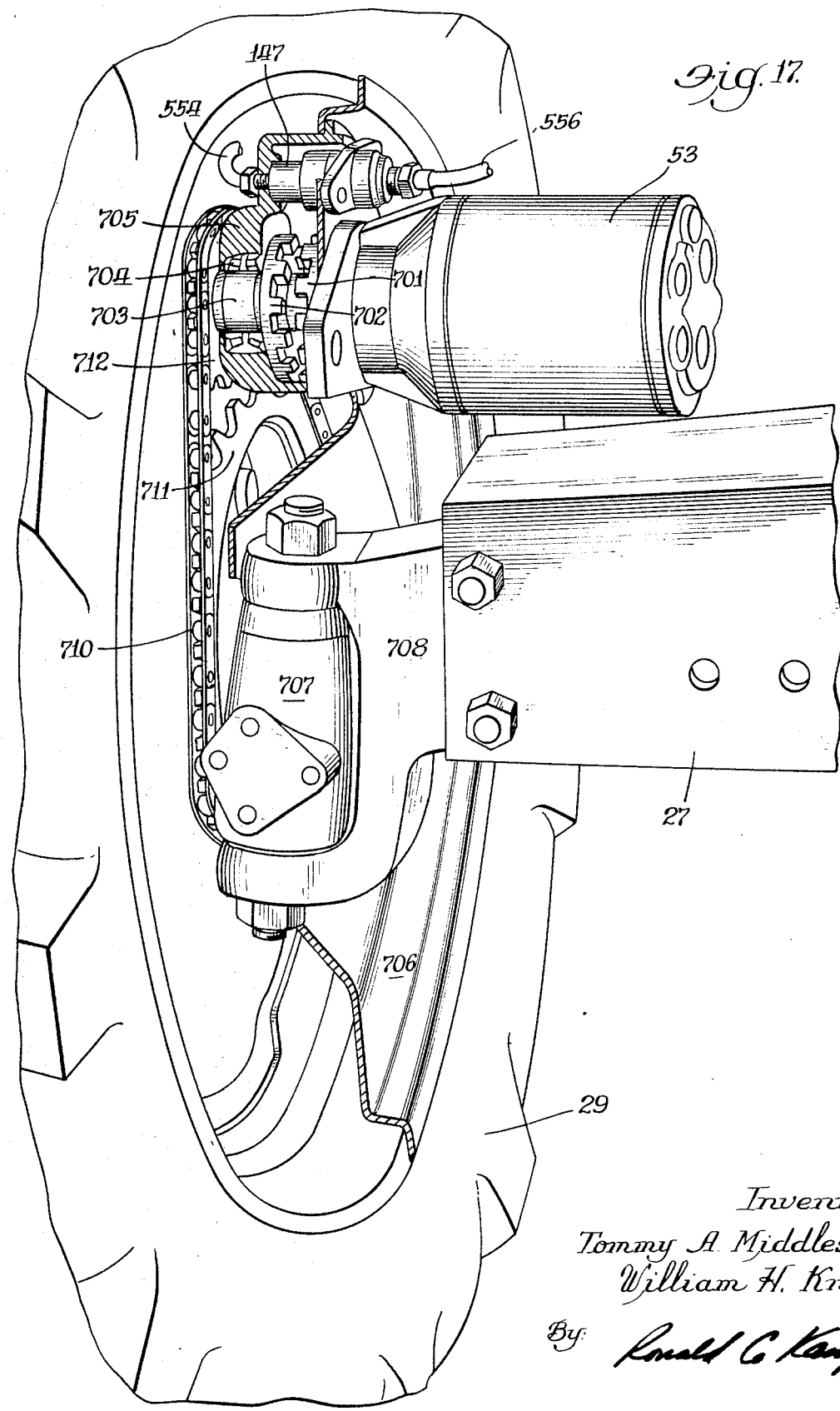

United States Patent Office 3,522,861
Patented Aug. 4, 1970

3,522,861
FOUR WHEEL DRIVE ATTACHMENT FOR COMBINES
Tommy A. Middlesworth, Hinsdale, Ill., and William H. Knapp, Davenport, Iowa, assignors to International Harvester Company, Chicago, Ill., a corporation of Delaware
Continuation-in-part of application Ser. No. 500,671, Oct. 22, 1965. This application Apr. 15, 1968, Ser. No. 742,988
Int. Cl. B60k 7/00, 17/34
U.S. Cl. 180—44                9 Claims

ABSTRACT OF THE DISCLOSURE

An auxiliary hydraulic drive apparatus for a vehicle having a pair of principal traction wheels and a pair of guiding wheels in which an auxiliary hydraulic power distribution means is interconnected between the change speed transmission of the vehicle and the guiding wheels, the power distribution means having a fixed displacement per revolution of the main traction wheels whereby the guiding wheels are driven in substantially the same peripheral linear velocity as that of the main traction wheels. Said apparatus also including mechanical or hydraulic clutch mechanisms for engaging and disengaging the system.

CROSS REFERENCE

This application is a continuation-in-part of application Ser. No. 500,671 filed Oct. 22, 1965, now abandoned.

BACKGROUND OF THE INVENTION

The present invention relates to change speed transmission drives. More particularly, the invention relates to auxiliary hydraulic drive means for selectively driving a pair of normally non-driving wheels of an agricultural vehicle and the like to provide added propulsion or drive for such vehicle.

Generally, an agricultural vehicle of the class with which the present invention concerns itself comprises a vehicle body which supports a pair of main drive or traction wheels and a pair of steerable wheels which are not generally concerned with driving the vehicle body, somewhat similar but not identical to the arrangement shown in U.S. Pat. 3,053,043 issued Sept. 11, 1962. The vehicle body, which is normally arranged in generally fore to aft disposition, supports the main drive wheels and the steerable wheels on its opposite end portions; and under most conditions, the main drive wheels, when normally driven, are capable of generating sufficient torque to drive or propel the vehicle body. However, from time to time under regularly encountered harvesting experiences, the main drive wheels are unable to provide sufficient force to drive the vehicle body. For example, the main drive wheels may slip due to adverse traction conditions. In such event, it is desirable that an auxiliary driving force be available.

Although not limited to an agricultural vehicle, this invention has particular application to harvesting machines. Bins for accumulating threshed grain are normally placed high on such machines somewhat to the rear of the large balloon tires, and the center of gravity of the machine varies both due to irregular surface conditions and to the extent of accumulation of threshed grain. As grain is accumulated or as the machine is driven up an incline, the center of gravity shifts rearward. Upon these conditions, some tractive effort from the rear guide wheels is desirable, but if excessive tractive effort is provided, the guide wheels would merely dig into the ground as they do not have sufficient surface area to both support the weight and provide excessive traction. Also while operating upon muddy terrain and when heavy loads are placed upon the guide wheels these guide wheels would have a tendency to sink into the ground thus limiting the ground speed of the vehicle. The main traction tires will have insufficient force to roll the mud and vegetation underneath the guide wheels and such will drag in front of these guide wheels. However if the guide wheels are forced to roll with equal linear peripheral speed as the main drive wheels there will be no drag effect due to the accumulation of mud and vegetation in front of the guide wheels, as they will roll over such vegetation.

SUMMARY OF THE INVENTION

Accordingly, applicants have devised a unique invention whereby optimum tractive force may be available to the agricultural vehicle at all times. This invention comprises basically an auxiliary hydraulic power distribution system having a hydraulic pump driven by the change speed transmission which directs hydraulic energy to hydraulic motors connected to the rear guide wheels. This system is further designed so as to apply optimum guide wheel torque desirable, dependent upon terrain conditions and loading of grain bins. Further unique clutch mechanisms are presented by which the auxiliary system may be completely engaged or disengaged.

In accordance with the instant invention and as a principal object thereof, there is provided a novel and improved hydraulic drive mechanism for operating a pair of auxiliary driving wheels of any four-wheel drive mechanism powered through a change speed transmission.

It is another object of the present invention to provide in a four-wheel vehicle having one pair of main traction or primary drive wheels, a simple adapting means for converting this two-wheel drive means into a four-wheel drive mechanism in which a pair of auxiliary wheels serve to provide drive traction when the main drive or traction wheels are unable to obtain traction adequate to drive the vehicle.

It is an additional object of the invention to include in such hydraulic means a hydraulic power system engageable with said change speed transmission to effect a correlation of the linear peripheral speed of the auxiliary drive wheels to the linear peripheral speed of the main drive wheels thereby obtaining optimum vehicle tractive effect.

Yet a further object of the instant invention is to provide a hydraulic power system in which the auxiliary wheels ordinarily follow the primary drive wheels and will only aid in driving the vehicle when the primary drive wheels provide insufficient tractive effect due to terrain conditions.

It is a further object of this invention to provide an auxiliary hydraulic drive system for a combine or other self propelled vehicle which will deliver a maximum tractive effort under all terrain conditions.

Further, novel and unique clutch mechanisms are provided for manually engaging and disengaging the auxiliary hydraulic power system when terrain conditions do not require its use.

The foregoing and other objects, features and advantages of the present invention will become more apparent upon consideraton of the following description and appended claims when considered in conjunction with the accompanying drawings wherein the same reference character or numeral refers to like or corresponding parts throughout the several views.

DESCRIPTION OF THE DRAWINGS

The manner in which the objects of the invention is attained will be made clear by a consideration of the following specification and claims when taken in conjunction with the accompanying drawings in which:

FIG. 1 is a perspective view of an agricultural combine vehicle embodying the instant invention, the nearest main drive or traction wheel having been removed, with parts being broken away to minimize crowding of the drawing and to better illustrate essential details of construction.

FIG. 2 is a horizontal sectional view of said agricultural vehicle and showing in plan an interconnecting linkage for simultaneous connection of the change speed transmission for the main drive or traction wheels to the power take-off of a pump for driving the hydraulic motor assemblies of the auxiliary or steering wheels and of a means for selective engagement of the hydraulic motor assemblies with the auxiliary or steerable wheels, parts being broken away for purpose of illustration.

FIG. 3 is a perspective view of a portion of the casing of the change speed transmission of said agricultural vehicle showing mounted thereon an adapter for driving a hydraulic pump, parts of the adapter housing broken away for the purpose of illustration.

FIG. 4 is an enlarged transverse sectional view of said change speed transmission elongated for the purpose of facilitating appreciation of the relationship of the parts thereof and said adapter.

FIG. 5 is a schematic diagram of the hydraulic system of said agricultural vehicle illustrating a hydraulic circuit which may be employed with the present invention.

FIG. 6 is an enlarged transverse sectional view elongated to show the relationship of the parts of the adapter clutch embodying said invention.

FIG. 8 is a transverse sectional view taken generally along the line A–B–C–D of FIG. 7 and vertically elongated to facilitate appreciation of the relationship between the gear elements in said torque transmission assembly, the transmission of said assembly being conditioned in this view for neutral operation.

FIG. 9 is an elevational view of the steerable or auxiliary drive wheels taken on a plane designated by the line 9—9 of FIG. 2 and looking in the direction indicated by the arrows.

FIG. 10 is a fragmentary vertical sectional view taken along the line 10—10 of FIG. 2 and looking in the direction of the arrows.

FIG. 11 is an enlarged elevational view of one of the double universal joints employed with the telescopic shift-control cross shaft linkage.

FIG. 14 is a perspective view of a portion of the housing of the change speed transmission of said agricultural vehicle showing mounted thereon the adapter for driving a hydraulic pump, and a hydraulic clutch mechanism for actuating said auxiliary hydraulic pump for driving the hydraulic motors of the steering wheels.

FIG. 15 is a schematic diagram illustrating a hydraulic circuit which may be employed to control the clutch mechanisms of FIG. 14.

FIG. 16 is a schematic diagram illustrating the clutch control circuit of FIG. 15 and the hydraulic circuit which may be employed with the auxiliary power distributive system.

FIG. 17 is a perspective view disclosing an alternative drive means for the rear guide wheels.

DETAILED DESCRIPTION OF THE INVENTION

Figure 7:
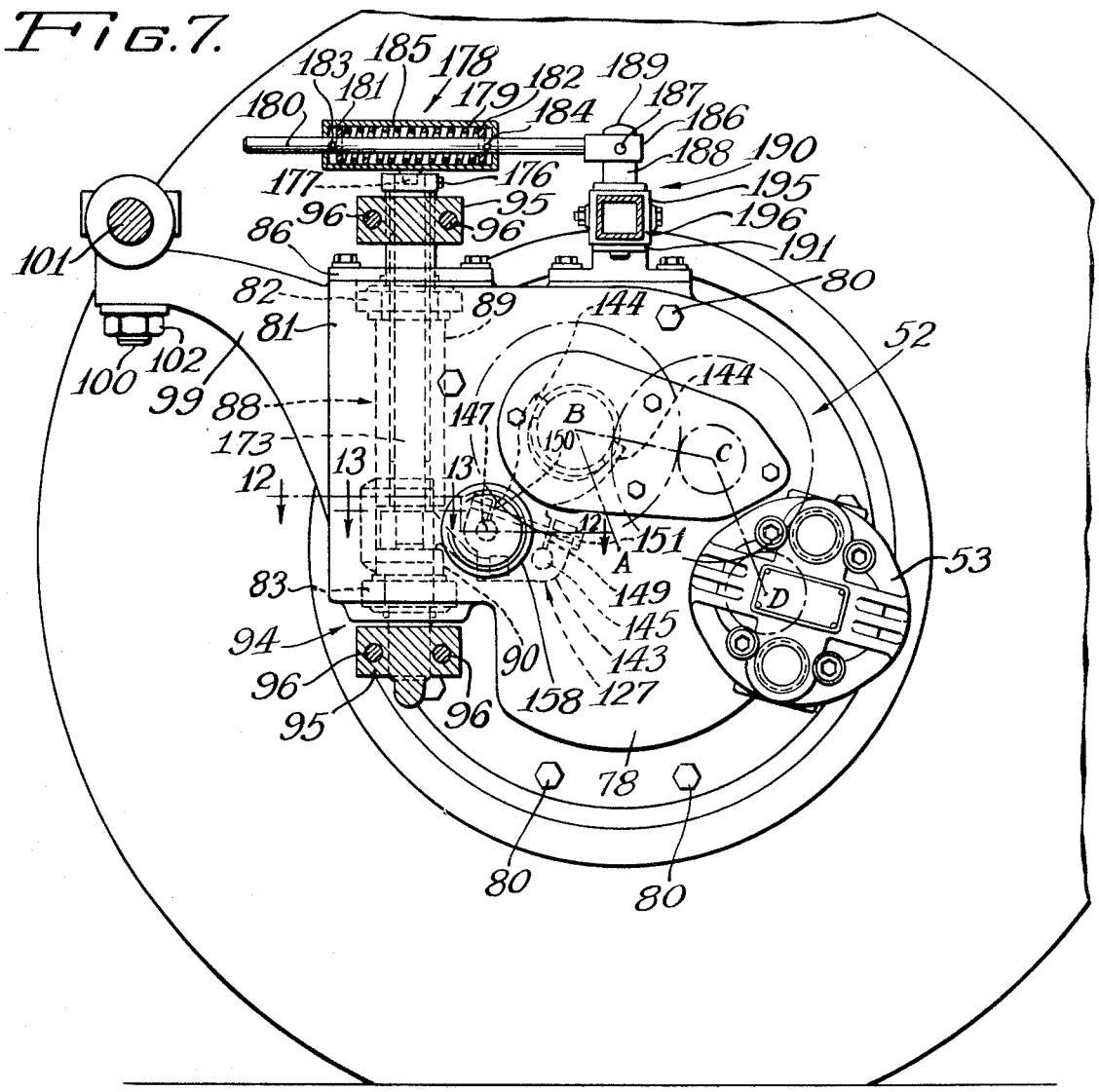
FIG. 7 is a side elevational view of the torque transmission assembly to one of the steerable or auxiliary wheels with portions thereof in section and as seen from a position opposite to the wheel attaching side taken substantially along the lines 7—7 of FIG. 2 and looking in the direction of the arrows.

Referring now more particularly to the drawings, attention is invited to FIG. 1 in which it is seen that for illustrative purposes the invention is embodied in a self-propelled agricultural combine vehicle generally designated 20. Since all of the components of the vehicle 20 are not of particularly pertinent interest to the invention herein disclosed, many thereof neither may be illustrated nor may be shown. The vehicle 20 may include as well-known and conventional components thereof a grain tank 21, a threshing chamber housing 22, an air blower assembly 23 and an operator's station 24, all of which may be conventionally mounted on a suitable frame which is generally designated by numeral 25. As illustrated in FIG. 1, the frame 25 has opposite end portions arranged in fore to aft relationship and supported or carried on a forwardly disposed axle assembly generally designated 26 and a rear axle assembly generally designated 27, respectively carried by a pair of laterally spaced apart forward traction or main drive wheels 28, only one of which is shown in FIG. 1, and a pair of laterally spaced apart rear steerable, guide or auxiliary wheels 29.

A suitable conventional mechanism (not shown) will be provided to control said steerable or guide wheels 29 from the operator's station 24 through a steering wheel 30 which is carried on a steering post or column 31 projecting upwardly from a platform 32 defining the operator's station 24. Other conventional structures of the combine would include a pulley 33 and a flywheel 34 which may be connected by a belt 35 to operate reciprocative components (not shown) disposed within the housing 22 while a belt, such as shown (fragmentarily) at 33a, may be provided to drivingly connect the pulley 33 with other driven elements of the combine.

Having reference now to the steerable guide or auxiliary wheels 29, there is associated with each thereof a torque transmission assembly indicated generally by reference numeral 52, as illustrated in FIG. 2, a portion of each torque transmission assembly being disposed within its respective guide wheel 29 as illustrated in FIG. 8.

Each of the transmission assemblies 52 is motivated or driven by a conventional fluid pressure motor such as the well-known fixed displacement reversible orbital type hydraulic motor, indicated generally as 53, which in turn receives fluid power through a circuit from pump 67 connected to change speed transmission 218 which drives the main traction wheels 28 as well as pump 67. The pump 67, and motors 53 with their associated circuit comprises the auxiliary hydraulic power system of this invention which is the essential structure in correlating the speed of the guide wheels with the main traction wheels as stated in the objects of the invention. Additionally provided are mechanical or hydraulic linkage systems for engaging and disengaging this auxiliary hydraulic system. Subtitles will hereafter be employed in the specification so as to set forth each major subcombination.

HYDRAULIC CIRCUIT

As illustrated in FIG. 5, each motor 53 may be valved in, or communicatively connected, to a common reservoir 54 which services a conventional combine hydraulic system. Said system may include such apparatus as a hydraulic platform lift 55 and a hydraulic steering mechanism 56 in which fluid pressure may be controlled by a fixed displacement pump 57 driven by engine 36 as illustrated in FIG. 5 and suitable valves such as 55a and 56a may be provided to operate these mechanisms in a well known manner. While the fluid system for the motors 53 is shown in the accompanying drawings to be independent from the fluid system for the remainder of the hydraulically operated mechanisms of the vehicle 20, except to the extent that a common reservoir 54 is employed, it is observed that various arrangements for supplying hydraulic fluid to the hydraulic system of motors 53 will be evident to those skilled in the art. Accordingly, it is not intended that the present invention be limited by details of the specific hydraulic system shown. Nevertheless, it is considered suitable to provide fluid for the hydraulic system of the motors 53 from the return conduit 60, through which fluid is being carried to a filter 59. Conduit 60 conducts the hydraulic fluid to a pair of intake conduits 61 and 62 of a closed system through a pair of valved ducts 63 and 64 having one way valves 63V and 64V, respectively. Valves 63V and 64V are normally held seated by the pressure of the system to close ducts 63 and 64, and preclude back flow, said valves opening only to permit flow into the system when the pressure on the reservoir side exceeds the pressure on the motor side of said valves.

Through a pair of conduits 65 and 66, the intake conduits 61 and 62 are communicatively connected to opposite sides of a fixed displacement reversible rotary type hydraulic pump 67 of conventional construction and by which the reversible operation of motors 53 is controlled. Conduits 65 and 66 are communicatively connected to a pair of relief valves 68 and 69 by means of the conduits 72 and 73, respectively, to relieve excess pressure in the hydraulic system of motors 53 through a return conduit 70. One end of conduit 70 is connected to a common duct 71 which connects the relief valves 68 and 69 and the other end of return conduit 70 bleeds said relief valves into the return conduit 58.

The end of the conduit 65 distal from the pump 67 is communicatively connected by suitable duct sections 74 and 75 to one side of each of the motors 53, whereas, the end portion of the conduit 66 distal from the pump 67 is communicatively connected to the opposite side of each of the motors 53 by means of suitable duct sections 76 and 77. The duct sections 75 and 76, being connected to opposite sides of one of motors 53, communicatively connect with each other through such motor, while the duct sections 74 and 77, being connected to opposite sides of the other of motors 53, communicate with each other through such other motor in a manner well understood in the art. Accordingly, as the pump 67 rotates in one direction with respect to FIG. 5, fluid will be driven through the system clockwise and the motors 53 will be correspondingly driven, whereas, when the pump 67 operates in a reverse direction, fluid will be pumped counterclockwise through the system with a corresponding reversal of the motors 53. It is appreciated that the conduits 65 and 66 are communicatively connected together at their pump ends through said pump 67 and that the conduits 72 and 73 communicatively connect together through the common duct 71, the opposite ends of which connect to relief valves 68 and 69. Thereby, throughout the hydraulic system of the motors 53 substantially uniform hydraulic pressure prevails at any given time. Accordingly, the torques of the motors 53 will be equal to each other and correspond to the pressure generated by pump 67. The manner in which pressure is generated by the pump 67 and the means therefore will be presently described.

Under normal operating conditions it is desirable that the propulsion for vehicle 20 be supplied entirely by the main drive or traction wheels 28, however conditions are often encountered in which adequate traction is not available to result in suitable self-propulsion of said vehicle. In such event, the steerable wheels 29 may be employed as auxiliary traction wheels by causing them to be driven by the motors 53 to help provide the torque for propelling the vehicle. However, when the main drive wheels 28 are able to generate sufficient traction to adequately propel the vehicle 20 without assistance from the auxiliary wheels 29 it is desirable that immediately the effective drive of the auxiliary wheels 29 be terminated. Accordingly, the hydraulic system for the motors 53 is proportioned so that the fluid flow produced in the system will be such that no driving torque will be provided by for the wheels 29 when the main traction wheels 29 are operating to provide suitable propulsion. The steerable or auxiliary drive wheels 29 follow the wheels 28 and do operate to produce or generate propelling energy while the front wheel drive is fully effective even though the motors 53 are in operation. Under such circumstances, the transmission assemblies 52 will merely idle.

One method of obtaining this proper proportion is to equate the linear peripheral velocity of the guide wheels with that of the main traction wheels thusly:

$$Wr_1 \times R_1 \times Dp = Wr_2 \times R_2 \times D_m$$

where $Wr_1$ is the velocity of a point on the effective rolling radius of the main traction wheels, $R_1$, is the gear ratios between the main traction wheels and the change speed transmission and $Dp$ is the displacement of the pump. $Wr_2$ is the linear peripheral velocity of the effective rolling radius of the guide wheels, $R_2$ is the gear ratio between the guide wheels and the motors and $D_m$ is the total displacement of the motors. Thus by selecting a displacement for either the pump or the motors, the displacement for the other may be easily ascertained or the displacement of the pump and motor may be equal and the equation solved for such displacement. If the displacements are ascertained by this formula, it is clear that the guide wheels will normally follow and be pulled by the main traction wheels, but if the ground speed is reduced as by the main wheels slipping, then the guide wheels will produce torque since they are designed to turn with substantially the same linear peripheral velocity as the main traction wheels.

MECHANICAL LINKAGE CONTROL SYSTEM

A mechanical shift arrangement is employed whereby the operator of the vehicle may selectively engage and disengage his auxiliary power hydraulic system.

To that end an upwardly projected shift stick 37 is mounted adjacent to the operator's seat 38 at the operator's station 24, as illustrated in FIG. 1. The stick 37 rocks a link-like extension 39 which projects forwardly from the lower end portion of said stick about an axis defined by pivot 40 which is suitably mounted in a bracket 41 adjacent the operator's station 24. The upper end portion of a rod or link 42 is pivotally connected to the link-like extension 39 as at 43, and said rod or link 42 at its lower end portion is pivotally connected to the outer end portion of one leg 44 of the crank member 45, the other leg 46 of which is pivotally connected to one end portion of a laterally slidable clutch rod 47 which hereinafter will be further described. The crank member 45 is secured on a forward end portion of an elongated rocker rod 48 which extends longitudinally of the frame 25. As illustrated in FIG. 1, opposite end portions of rocker rod 48 are journalled to a pair of longitudinally spaced apart hangers or suspenders 49 which may be suitably connected to frame 25 by any conventional means.

As illustrated in FIG. 1, the plane of the link-like extension 39 is normal to the plane of the crank member 45 and therefore, as the shift stick 37 is rocked to and fro in a vertical plane to reciprocate the rod or link 42 upwardly and downwardly, the rocker rod 48 will be rocked about a thereby defined axis to alternately convert normally non-driven wheels 29 into engine driven members by means which will become presently apparent.

TORQUE TRANSMISSION ASSEMBLY AND CLUTCH MEANS

Figure 12:
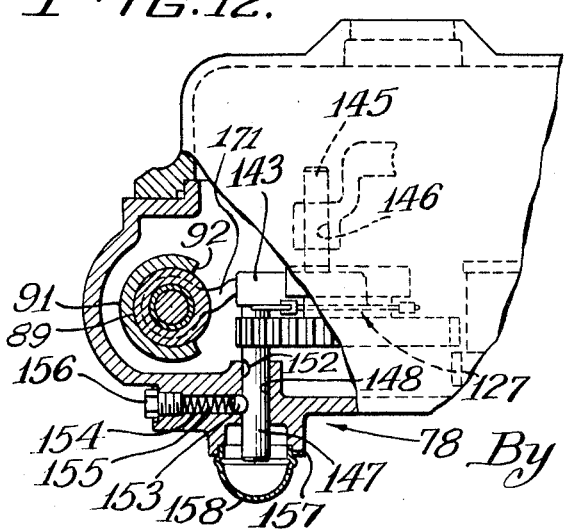
FIG. 12 is a fragmentary, horizontal and generally sectional view in enlarged dimensions taken substantially along the line 12—12 of FIG. 7 and looking in the direction of the arrows.
Figure 13:
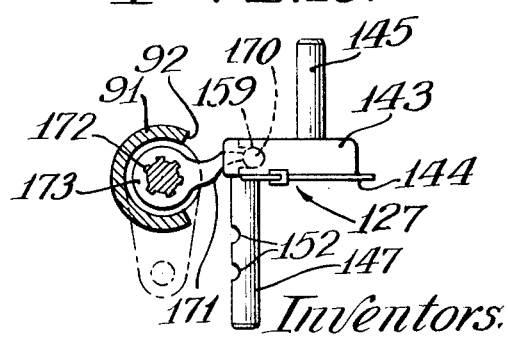
FIG. 13 is a fragmentary horizontal enlarged view partially in section and taken substantially along line 13—13 of FIG. 7 and looking in the direction of the arrows.

While the invention may be employed with auxiliary or steerable wheel assemblies of varying construction, a specific assembly such as illustrated in FIG. 8 may be utilized. Each guide wheel torque transmission assembly 52, as fashioned, includes an inboard housing or casing portion 78 and an outboard housing or casing portion 79, releasably secured together by means of suitable securing members, such as bolts or cap screws 80. As illustrated in FIG. 7, a forwardly extending portion 81 of each inboard casing portion 78 provides vertically spaced co-axial upper and lower openings 82 and 83, the upper opening being fitted with anti-friction bearing means 84, as illustrated in FIG. 10, while the lower opening is fitted with anti-friction bearing means 85. Each upper opening 82 is covered with a cover plate 86 which is secured by suitable means such as cap screws 87. The bearings 84 and 85 associated with each wheel 29 rotatably receive and journal a kingpin assembly indicated generally by the reference numeral 88. Each kingpin assembly, as best seen in FIGS. 7 and 10, includes an elongated upper tubular spindle member 89, a lower solid spindle, stud or pin 90 coaxially aligned therewith but vertically spaced therefrom and an intermediate bridging or interconnecting member 91 generally tubular in shape with a portion on one side thereof open or cut away as at 92, as illustrated in FIGS. 10, 12 and 13. Each bridging or interconnecting member is rigidly secured by means such as welding, brazing or the like, as indicated at 93 in FIG. 10, to an associated tubular member 89 and pin or stud 90 to provide a rigid unitary assembly. The outwardly extending upper end portion of each tubular member 89 and the outwardly extending lower end portion of its corresponding or associated stud or pin 90 are journalled in the upper and lower arms respectively of a yoke 94 fashioned at a respective end of the rear axle assembly 27, as illustrated in FIGS. 7, 8, 9 and 10. The journalling means provided at the ends of each of the arms of each yoke 94 may include a split bearing 95 secured to its respective yoke arm by suitable screw means 96 after a respective kingpin assembly 88 has been positioned therewithin. The end portions of each kingpin assembly 88 are reduced along sections as shown at 97 and 98 adjacent the respective yoke arm bearings to the end that shoulders are formed that may abut the inner races of the respective bearings and thus accommodate vertical thrusts of proximate bearings as well as restrict axial displacement of such kingpin assembly.

Extending forwardly from each inboard casing portion 78 and preferably formed integral therewith is a steering control arm 99 as clearly illustrated in FIGS. 7 and 9 and the shape of which is readily apparent by reference to FIG. 7. The outer end of each steering control arm is pivotally connected by a stud or bolt 100 pivotally mounted in a respective end portion of a transversally extending tie-rod 101, as illustrated in FIGS. 7 and 9. Threaded nuts 102 secure respective bolts in position. Although any desired conventional means may be provided for operatively connecting the operator's steering wheel 30 with the tie-rod linkage mechanism for exercising steering control, as illustrated herein, there may be included a hydraulic cylinder or ram 103 the fixed end of which may be pivotally mounted as at 104 to the rear axle assembly 27 while the opposite or extendable end of the ram 103 may be pivotally connected to one of the bolts 100 as illustrated in FIGS. 2 and 9. Conduits 105 and 106 may be provided for connecting said ram in conventional manner into a suitable source of fluid pressure as well as to a conventional control valve operable by the steering wheel 30, all by means well known; but since such latter elements form no particular part of the inventive concepts hereof, they are not shown and further details thereof appear unnecessary.

Each hydraulic motor 53 may be rigidly secured to a respective transmission assembly inboard casing portion 78 by suitable means such as bolts 107 as clearly illustrated in FIG. 8. An aperture 108 in the wall of each casing portion 78 accommodates the drive shaft 109 of a respective hydraulic motor 53. Each shaft extends into its respective transmission unit 52 and has a gear 113 suitably affixed to the free end thereof for rotation therewith. Each gear 113 is in continuous meshing engagement with a gear 110 mounted by splines 111 on a shaft 112. Such shaft 112 is disposed parallel with the shaft 109 and has opposite ends thereof journalled by anti-friction bearing means 114 and 115 which in turn are mounted in opposite wall portions of its inboard casing member 78. The outboard end of each shaft 112 has a threaded nut 116 thereon which cooperates with a washer 117 that is in engagement with bearings 114 to restrain its shaft 112 from the axial movement in one direction. A shoulder 118, fashioned on the inboard end portion of each shaft 112 and which is disposed in engagement with its associated bearing 115, restrains such shaft 112 from axial movement in an opposite direction. A collar 120 which is rigidly secured on a medial portion of each shaft 112 holds its gear 110 against the inboard surface of associated bearing 114 thereby to retain such gear 110 in continuous mesh with its gear 113 and also precludes axial movement of said gear 110. Another gear 121 is mounted on the inboard end portion of the shaft 112 and is also constrained for rotation therewith. Exterior splines 122 on a shaft 123 of each transmission assembly 52 secure a gear 124 from rotation independently of each shaft 123 however permitting slidable axial movement thereon. Each gear 124 has a hub portion 125 with an annular recess or channel 126 in which is operably engaged a shifter fork mechanism, such as is indicated fragmentarily at 127 in FIG. 8. Each gear 124 is axially slidable through actuation by its shifter fork mechanism 127 in one direction for effecting mesh with gear 121 to condition its transmission assembly 52 to drive and in an opposite direction for effecting disengagement of such gear 124 from its gear 121 to condition its transmission assembly 52 neutrally to interrupt a power train through such transmission. In such neutral position each transmission unit is termed as being conditioned for free wheeling operation.

As illustrated in FIG. 8, the shaft 123 of each transmission assembly 52 is journalled at its opposite ends in opposite side walls of a corresponding inboard casing portion 78 by a pair of opposed anti-friction bearing members 128 and 129. The outboard end of each shaft 123 has thereon suitably mounted a pinion gear 130 which is constrained for rotation with its shaft 123. Each pinion gear is disposed for continuous meshing engagement with a ring gear 131 mounted by splines 132 on a stub shaft 133, the inboard end of which is journalled by anti-friction bearing means 134 which is mounted in a side wall of each transmission inboard casing portion 78, while the outboard end portion of such shaft 133 is journalled by anti-friction bearing means 135 in its transmission outboard casing portion 79.

The outboard end portion of each stub shaft 133 includes an integrally fashioned wheel hub 136 which has a flange 137 that seatingly mates with a central inner portion of a flange 138 of a corresponding steerable wheel 29. The hub flange 137 is releasably secured to an associated wheel flange 138 by suitable means such as bolts or cap screws 139, only some of which have been identified by number of FIG. 8. A nut 140 threaded on the inboard end of each stub shaft 133 cooperates with a washer 141 that is in close fitting contact with a respective bearing 134 and with a shoulder 142 on associated hub 136 that is in close fitting contact with the corresponding bearing 135 in order to retain such stub shaft 133 against axial displacement.

Each shifter fork 127, as best seen in FIGS. 7, 12 and 13, includes a fork-like body member 143 having yoke-like arms 144 extending outwardly from its body member with its arms dimensioned to fit with limited axial clearance into the annular recess or channel 126 provided in the hub 125 of an associated gear 124. Each fork-like body member 143 has projecting outwardly therefrom in one direction a rail guide member 145 that is slidably received in an aperture 146 in a part of the wall of its associated inboard casing portion 78, and another rail member 147 which extends outwardly from an oppositely facing surface of such fork-like body member 143 for slidable accommodation in an aperture 148 in another part of the wall of its associated inboard casing portion 78. The guide rail members 145 and 147 of each associated pair thereof are positioned at one end of each thereof in split apertures 149 and 150 provided in their fork-like body members 143 and are releasably secured in place by suitable means such as a bolt 151 which simultaneously tightly clamps both of such guide rails 145 and 147 within their respective apertures, as best shown in FIG. 7.

The rail member 147 of each shifter fork 127 is provided with a plurality of axially spaced detent grooves or recesses 152, the recesses of each rail member 147 being for a corresponding operating condition of its associated transmission unit 52, with each groove of each assembly 52 dimensioned to receive a ball detent 153, which, in turn, is disposed in an associated aperture 154 in its inboard casing portion 78. As illustrated in FIG. 12, a coil spring 155 bears against each ball detent 153 to urge the same into a selected one of the grooves 152. Each coil spring 155 is retained in place by a threaded closure plug 156, as illustrated in FIG. 12. The outer end of each guide rail 147 projects outwardly through an aperture 157 in a section of the wall of its inboard casing portion 78, such aperture 157 being covered with a dome-shaped closure cap 158 that may be removably wedge-fitted into place in its respective aperture, as illustrated in FIGS. 8 and 12.

Each shifter fork-like body member 143 has an outwardly opening recess 159 therein adapted to receive the ball shaped end 170 of an actuating arm 171, the opposite end of which is mounted as by splines 172 on the lower end portion of a post or spindle 173 which is dimensioned for rotational journalling fit within a corresponding kingpin tubular member 89, as illustrated in FIGS. 10 and 13, while such actuating arm 171 extends through and for rotation within the opening 92 of the bridging member 91 of its associated kingpin assembly 88.

The outwardly extending upper end portion of each spindle 173 has mounted thereon for rotation therewith a shifter arm 174, as illustrated in FIGS. 2, 9 and 10. Each shifter arm may be rotationally secured to an associated spindle 173 by any suitable means such as an interlocking key 175 which is positionable in mating axially extending slots or recesses in a respective arm or spindle, while a set screw 176, which threadably extends through each shifter arm to a corresponding spindle, may be provided to prevent accidental axial displacement of such shifter arm. The shifter arms 174 are disposed in opposed positions and normally extend parallel to the axis of the rear axle assembly 27. The inboard end of each of said shifter arms 174 is pivotally connected to a stud or pin 177 which is suitably secured to and depends from the lower surface of an associated spring-loaded link structure 178.

Each of said link structures is resiliently yieldable and includes a closed-ended elongated container 179 having suitable apertures in each end thereof that slidably accommodate a rod-like link member 180 which extends therethrough, as illustrated in FIGS. 2 and 7. A pair of washers 181 and 182 are disposed within each container 179 and in axially spaced apart positions adjacent the opposite ends of their respective container 179. A pair of pins 183 and 184, which extend through each rod-like link member 180 in axially spaced apart positions within each container 179 between the washers 181 and 182 and opposite end portions of a corresponding container 179, are adapted to engage said washers 181 and 182 respectively to limit each washer from axial movement toward an adjacent end of such tube. Each of the washers 181 and 182, however, is adapted to engage an opposite end of a coil spring 185 disposed within each container 179 about an associated rod-like link member 180, whereby movement of each rod-like link member in alternate directions from a neutral position tends to compress an associated spring 185 from opposite ends thereof when resistance to movement of a corresponding shifter arm 174 exceeds a predetermined level. While the resilient yieldable facility or feature provided by the spring loaded link structure 178 is of no particular usefulness when shifting the transmission assemblies 52 from rear wheel drive condition to neutral condition, the facility is particularly useful when gears 124 are shifted from neutral condition toward drive condition and the teeth of the gears to be meshed are not in alignment or in readily engageable relationship. In such event, the compression of a spring 185 will continue to urge an associated shifter arm 174 to selected position so that as soon as the disengaged gears 121 and 124 are in meshing alignment, meshing will be achieved under the urging of such spring 185.

While one end portion of each rod member 180 projects freely outwardly from its associated container 179, the opposite end portion is suitably affixed to a U or bail-shaped member 186, the arms of which are pivotally connected as at 187 to block 188 which is disposed between the arms of such bail-shaped member 186, as illustrated in FIGS. 7 and 11. A large headed pin 189 pivotally positioned with the shank thereof extending through each block 188 also has a portion of said shank extending through a universal joint indicated generally as 190. One bail member 191 of each universal joint is rigidly secured to a stub shaft 192 that is journalled by a bearing support 193 fixed by suitable releasably securable means such as cap screws 194 to an associated inboard casing portion 78, while the other bail member 195 of each universal joint is fixed to an opposite part of the control linkage previously designated generally as 50, as illustrated in FIG. 2. The control linkage 50 comprises an outer tubular section 196 and an inner telescopic member 197 the opposite lateral end portions of which are respectively secured to the opposed bail or yoke members 195, as illustrated in FIGS. 2, 7 and 11.

It will be appreciated that as arranged, each universal joint 190 is, in effect, a double universal joint which permits freedom of rotational movement of the telescopic control linkage 50 and shifting of the opposite transmission assemblies 52 when the steerable wheels 29 are not parallel, or when they are tilted about a vertical axis toward or away from one another. The arrangement, in effect, compensates for the different turning radii of the steerable wheels 29 when the vehicle 20 is being turned. Such arrangement also permits freedom of movement of each spring loaded link structure 178 relative to the telescopic linkage 50 when movements thereof are brought about by tilting of the steerable wheel structures.

Telescopic steering control linkage 50 is rotatable about the longitudinal axis thereof to effect shifting of the gears in the transmission assemblies 52 of the steerable wheels 29 as will be presently additionally explained. As illustrated, the inner and outer elements 196 and 197 of said steering control linkage 50 are tubes which are substantially square in cross section to the end that the tubular elements 196 and 197 are constrained for rotation with one another. It is appreciated of course that other well-known interlocking means may be employed to accomplish such telescoping and concomitant rotation; and hence it is desired that the present invention not be limited to the specific means disclosed herein for such purpose.

As illustrated in FIGS. 2 and 9, a slotted arm 198 disposed around the outer telescopic tubular section 196 is rigidly secured thereto by suitable means such as brazing, welding or the like as indicated at 199 in FIG. 2. The free end of said arm 198 is pivotally connected as at 200 to one end of a rod of link 201. A bellcrank 202 comprising an element of heretofore defined linkage 51 is pivotally connected as at 203 to a portion of frame 25 with one end of said crank 202 being connected to the other end portion of rod or link 201 as at 204 and the opposite end of said bellcrank 202 being pivotally connected as at 205 to an end portion of link or rod 206. The opposite end portion of link or rod 206 is pivotally connected as at 207 to an end portion of a crank arm 208 an opposite portion of which is rigidly secured to the aft end portion of the rockable shaft 48 heretofore defined.

From the foregoing, it is now apparent that as the stick 37 is rocked to one of its two positions namely neutral or drive, the rock rod 48 will be rocked correspondingly to cause the gear 124 of each of the transmission assemblies 52 to slide out of or into mesh with its respective gear 121. However, it is not sufficient for driving the auxiliary wheels 29 that the gears 124 and 121 be enmeshed. It is also required that the stub shaft 133 be rotated. To that end it is necessary that means be provided for synchronous actuation of motors 53. In accordance with the present invention, such means are operated by control shift stick 37, which when moved to an attitude that will cause the rocking of the rock rod 48 to engage gears 124 and 121 in driving relationship, also will cause means actuated by rod 47 to be simultaneously engaged to operate the motors 53. Contrarywise, when the control shift stick 37 is rocked in a manner such that the gears 124 disengage respective gears 121, the rod 47 is moved or operated to cause cutting off of torque of motors 53. The means by which motors 53 are connected into the power train of the vehicle 20 are illustrated in FIGS. 1-4, inclusively, and 6.

POWER TRAIN—CHANGE SPEED TRANSMISSION

Relative thereto, attention is now invited to FIG. 1 in which it is shown that the opposite end portions (only one of which is seen in FIG. 1) of the front axle assembly 26 are fashioned with a pair of opposed mounting bosses or flanges 210 to which a pair of bull-gear casings 209 are rigidly secured by suitable fasteners 211. As illustrated in FIG. 2, each of the bull-gear casings 209 houses a bull gear 212 which is in mesh with a pinion 334 operative for driving the respective bull gears. Bull gears 212 may be conventionally fashioned as internal ring-gears with each having a hub portion (not shown) which is rigidly secured to a respective adjacent opposite end portion of the shaft 213 comprising axle assembly 26, as illustrated in FIG. 1. Laterally of the casings 209 the opposite end portions of the shaft 213 are formed or fashioned with a pair of apertured mounting bosses or flanges 214 only one of which is seen in FIG. 1 by reason of the omission of the proximate wheel 28. Flanges or mounting bosses 214 provide the means by which the webs 215 of main drive or traction wheels 28 are mounted onto the front axle assembly 26 in a conventional manner. Accordingly, as the bull gears 212 rotate, they carry therewith the shaft 213 and wheels 28 mounted thereon.

As illustrated in FIGS. 1 and 2, the main drive shaft 333 of vehicle 20 and comprising a pair of coaxially aligned sections 216 and 217 which project laterally from opposite sides of what may be a conventional change speed transmission housing 218, have a pair of pinions 334 which are operably secured on opposite end portions thereof. Said pinions 334 are in driving mesh with the bull gears 212, respectively, and substantially equally spaced from housing 218 which is shown as being disposed substantially equidistant from the main drive or traction wheels 28. The lateral or outer end portions of the main drive shaft sections 216 and 217 are projected through a pair of brake mechanisms 219 which are suitably supported adjacent respective gear casings 209. Inasmuch as the construction of the brake mechanism 219 may be conventional, the details of construction of such brakes are omitted. The housing 220 of a conventional change speed transmission clutch (not shown) is mounted adjacent to the change speed transmission housing 218. Inasmuch as the details of construction of such transmission clutch may be conventional and are not critical to the present invention, such clutch details are not shown. A driveable clutch shaft 221, to which one of such clutch components is rigidly secured in a conventional fashion, projects outwardly from the transmission clutch housing 220 and supports a sheave 222 which is suitably rigidly secured on said shaft 221 by any suitable means. Sheave 222 is adapted to be driven by a belt 223 which is operably connected to the prime mover means shown diagrammatically in FIG. 5 as engine 36 to provide the torque for rotation of the drive shaft 333 all of which may be done in a conventional manner. Attention is invited to the fact that neither the details of construction of change speed transmission 224 disposed within the transmission housing 218 nor the means for driving said transmission 224 is critical to the instant invention and therefore the details of construction thereof, to the extent herein disclosed, are not intended as limiting upon the invention.

The change speed transmission 224 as well as the clutch within the transmission clutch housing 220 are operated from the operator's station 24 by means which may be conventional. Such means, therefore, have been omitted from the drawings to the end that structures considered more relevant to the essence of the invention are not crowded in the drawing. However, to the end that appreciation of the invention is facilitated, details of transmission 224 are described and are shown in FIG. 4. The transmission 224 is motivated by a transmission input shaft 225 which is operably connected to the drivable clutch shaft 221 in a conventional manner by means (not shown) in the clutch housing 220 and controlled from the operator's station 24. As illustrated in FIG. 4, the input shaft 225 is projected into the housing 218 through anti-friction bearing member 226 which is suitably retained in a bearing cap 227 which closes an opening in the wall 259 of said housing 218 to which said cap 227 is secured by means of suitable fasteners such as bolts or cap screws or the like 228. An input gear 229 is rigidly secured on or formed integral with the output end portion of the input shaft 225 within housing 218, said gear 229, accordingly, being constrained for rotation with the input shaft 225. The gear 229 is in continuous mesh with a gear 230 which, by splines 253, is contrained for rotation with a shaft 231 which is disposed parallel to shaft 225. As illustrated in FIG. 4, the shaft 225 has a groove in which there is mounted a retainer or snap ring 232 which bears against the outboard surface of the bearing member 226 to restrain the shaft 225 from longitudinal movement axially thereof farther into the transmission casing 218, axial movement of said shaft 225 in an opposite direction being precluded by the diameter of the gear 229 which is larger than the diameter of the aperture defined by the bearing member 226. The shaft 231 at one end is journalled in an anti-friction bearing 233 which is suitably retained in the transmission housing wall 259, the outboard end of said shaft 231 and bearing member 233 being covered by cap 227, heretofore defined. On the other end such shaft 231 is suitably journalled in a suitable opening in housing 218 by means which are not seen inasmuch as portions of said last mentioned shaft have been broken away to preclude obscuring details of other construction. As illustrated, a snap ring or retainer 234 is disposed in a groove in one end portion of the shaft 231 and engages the outer surface of the bearing member 233 thereby restraining the last mentioned shaft from axial movement to the right with respect to FIG. 4. Like means (not shown) for restraining axial movement in an opposite direction may be provided on the opposite end of said shaft 231. Axial movement of the gear 230 on shaft 231 in one direction is precluded by engagement of hub projection 235 of said gear with the inner surface of bearing member 233. Axial movement of the gear 230 in an opposite direction is precluded by abutment of a hub projection 236 of gear 230 with the hub projection 237 of a change speed gear 238 with which the gear 230 forms a cluster. The gear 238 is mounted on the shaft 231 by splines 253 whereby said last mentioned gear is constrained for rotation with said shaft 231, said gear 238 being restrained in one direction from axial movement by engagement with the hub portion 236 and in the opposite direction by engagement with a collar 239 which is suitably secured on a shaft 231. From the foregoing, it is apparent that as the gear 229 rotates, the shaft 231 will be driven by reason of continuous engagement of the gears 229 and 230.

As illustrated in FIG. 4, the gear 229 defines a pocket or seat 240 in which there is suitably mounted an anti-friction bearing member 241 which provides a journal for a reduced end portion 242 of a shaft 243. Shaft 243 is coaxially aligned with the input shaft 225 and has an end portion 244 which projects outwardly from one wall 245 of the transmission casing 218 through an anti-friction bearing member 246 which is suitably secured in an aperture in said wall 245. A change speed gear 247 is mounted on the shaft 243 and constrained for rotation therewith by means of splines 248, said gear 247 being retained from movement axially of its shaft in one direction by engagement with a collar 249 secured to said shaft and in an opposite direction by engagement of the hub of said change speed gear 247 with the inner surface of bearing member 246.

Shiftable gear 250 is also splined on the shaft 243 whereby it is constrained for rotation therewith, said gear 250 being disposed between gears 229 and 247. However, shiftable gear 250 is slidable axially of shaft 243, shifting of said gear 250 being effectuated by a shifting fork 251 opposite legs of which engage in a conventional manner in a groove 338 provided for said shifting fork in the hub in said gear 250. The gear 250 is shiftable into and out of mesh with the gear 238 whereby input torque can be directly transferred to the shaft 243 from the gear 238 to thereby provide for conditioning of transmission 224 for a first drive speed.

A second shiftable gear 252 is constrained for rotation with the shaft 231 by means of the splines 253 along which said gear 252 is shiftable on shaft 231 into and out of engagement with the gear 247 whereby input torque can be selectively transferred to the shaft 243 through said gear 247 to thereby provide for conditioning of the transmission 224 for a second drive speed. Both the first drive speed resulting from operable engagement of gears 250 and 238 and the second drive speed resulting from operable engagement of gears 252 and 247 are forward transmission conditions. The gear 252 is shiftable by means of a shifting fork 254 the opposite legs of which engage in a groove 255 provided for said fork in the hub of gear 252 to shift the same to a selected one of three positions, namely, engagement with the gear 247, the neutral position (which is that shown in FIG. 4), and lastly into engagement with a reverse gear 256 for affecting reverse drive.

The shifting forks 251 and 254 are operably connected to a pair of shifting rods 257 and 258 both of which are seen in FIG. 3 but only one of which is illustrated in FIG. 4 by reason of the plane of the section. Shifting rods 257 and 258 project through openings in opposite walls 259 and 245 in which they are slidable transversely of housing 218, sliding of said shifting rods being facilitated by means of an opposed pair of anti-friction members 260. An end portion of each of the rods 257 and 258 is operably connected to shifting rod control means (not shown) which may be of conventional construction and operated from the operator's station 24.

The gear 256 and a gear 261 are mounted in a cluster on a shaft 262 which is parallel to shaft 231 and with which said last mentioned gears are constrained for rotation by means of shaft splines 263. The cluster comprising the gears 256 and 261 is precluded from movement axially of the shaft 262 in one direction by engagement of gear 256 with a collar 264 suitably secured on a medial part of said shaft 262 and in an opposite direction by engagement of gear 261 with the inner end of an anti-friction bearing member 265 which is suitably secured in the wall 245 of the casing 218. Bearing member 265 provides a journal for one end portion of the shaft 262 while the opposite end portion of said shaft is journalled in an anti-friction bearing member 266 suitably secured in the wall 259 of the casing 218. The shaft 262 is precluded from axial displacement in one direction by reason of a retainer such as a snap ring 267 which is mounted in a groove provided in an end portion of the shaft 262 which is projected through an opening in transmission housing wall 259, the snap ring 267 engaging, for retention, the outer surfaces of bearing member 266. The opposite end portion of the shaft 262 is projected through the wall 245 of the casing 218 to provide an extension 268 for splines 263 of which a gear 269 is constrained for rotation with said shaft 262. The abutment of the body of gear 269 with the outer surface of the bearing member 265 restrains the shaft 262 from moving axially to the left with respect to FIG. 4. Simultaneously, such abutment restrains axial movement of the gear 269 to the left with respect to FIG. 4 while axial movement of gear 269 in an opposite direction is restrained by a tension nut 270 suitably mounted on a reduced outer part of the end portion 268 and bearing against one end of a compression spring 271 which is mounted about shaft end portion 268 with its opposite end bearing against gear 269.

A shaft 272, parallel with shaft 262 and having opposite end portions journalled in a pair of anti-friction bearing members 273 and 274 which are suitably retained respectively, in the bearing cap 227 and in the wall 245 of transmission housing 218, carries or has integrally fashioned therewith a pair of axially spaced apart gears 275 and 276, the gear 276 being in continuous mesh with the gear 261 and the gear 275 being in continuous mesh with the ring gear component 277 of a standard transmission differential generally designated as 278. As illustrated in FIG. 4, drive shaft sections 216 and 217 which are disposed parallel with shaft 272 are simultaneously driven in unison in the same direction by the differential 278 to thereby drive the pinions 334 whereby the main drive or traction wheels 28 are driven.

To the end that the sections 216 and 217 are driven, each of said sections is coupled to the corresponding of a pair of oppositely extending coaxially aligned differential stub shaft sections 279 and 280 by means of a sleeve 281 which bridges each pair of coupled members. Keying as at 282 constrains each sleeve for rotation with its drive shaft section and differential stub shaft. As illustrated, the outer end portions of said stub shafts 279 and 280 are projected outwardly from opposite sides of the transmission casing 218 and a set screw 283 threaded through each of the sleeves 281 and bearing against the outwardly projected portion of its associated stub shaft serves to retain a corresponding sleeve from displacement axially of the main drive shaft 333.

To motivate the main drive shaft in forward speeds a gear 284 is rigidly secured on the outwardly projected end portion 244 of the shaft 243. A hub projection 285 of gear 284 abuts the outer surface of the bearing member 246 and thereby serves to prevent axial displacement of the shaft 243 to the left with respect to FIG. 4 and simultaneously serves to prevent axial displacement of the gear 284 to the left. A tensioned nut 286 mounted on the threaded reduced outer end portion of the shaft 243 serves to preclude axial movement of the gear 284 away from its abutment with the bearing member 246, said nut 286 being tensioned by a compression spring 287 disposed about shaft end portion 244 with the opposite ends of said spring bearing against the nut 286 and the gear 284 biasing the latter into engagement with the bearing member 246. While the shafts 243, 231, 262 and 272 are disposed parallel with each other and to the main drive shaft 333, as illustrated in FIG. 4, in such view the relationship of the parts has been distorted intentionally for the purpose of illustration. Thereby, gears 284 and 269 which are in continuous mesh, as is evident by reference to FIG. 3, appear out of mesh in FIG. 4. However, bearing in mind that in fact gears 284 and 269 are in continuous mesh, it is appreciated that should torque be imposed on shaft 243, that is when this transmission 224 is conditioned either by operative engagement of gears 250 and 238 or gears 252 and 247, such torque will be transferred to the gear 284 and, accordingly, to the gear 269 to cause forward driving of the wheels 28 at speeds corresponding to the gear ratios. The torque of the gear 269 which is imposed thereon by gear 284 is transmitted through shaft 262 to the gear 261 and from there to the gear 276 and accordingly to the shaft 272 with which the gear 276 is integral to rotate the gear 275 to rotate the differential ring gear 277 in selected of the forward drive speed ratios. Thus in reverse and in all forward speeds shaft 262 functions as the transmission output shaft. It should be noted that the principal traction wheels 28, and the pump 67 are driven from the output shaft 262. It is apparent by having reference to FIG. 4 that the transmission condition therein illustrated is neutral as the gears for forward speed drives are not enmeshed.

The change speed transmission 224 illustrated herein is also adapted for reversible drive as heretofore indicated. For such reversal the transmission is conditioned with the gears 250 and 247 out of mesh or in "neutral" and with gear 252 enmeshed with the gear 256. In such event input torque from shaft 225 is imposed in its usual manner on shaft 231 through mesh of gears 229 and 230. Through gear 252 torque of shaft 231 is imposed directly on the shaft 262, neither the shaft 243 nor the gears 284 and 269 being in the reverse drive power train. Once "reverse" torque is imposed on shaft 262, the path of such torque transmission to wheels 28 is the same as the path for torque of forward drive heretofore described.

As illustrated in FIG. 4, the oppositely extending differential stub shaft sections 279 and 280 have inner end portions 288 and 289 which are disposed within the transmission housing 218 from which the opposite stub shaft sections 279 and 280 are projected outwardly through a pair of opposed antifriction bearing members 291. Each of said last bearing members is retained from outward or lateral movement by abutment with a shoulder in a bearing cover 292 against which such bearing member is held by a spring ring or retainer 293 which engages the inner face of such bearing member. Each bearing cover 292 is secured in coaxial alignment with the other thereof in an aperture of respective walls 259 and 245 by suitable fasteners such as bolts or the like 294 which releasably secure mounting flanges of said caps 292 to the housing 218. A snap ring or retainer 295 engaged in a groove provided therefor in each of the stub shaft sections 279 and 280 and abutting the outer surface of an associated bearing member 291 facilitates retention of its respective stub shaft section from axial displacement. A pair of coaxially aligned bevel gears 296 and 297 which are disposed within a differential housing 299 are keyed or splined as at 298 to adjacent inner end portions 288 and 289 of the stub shaft sections 279 and 280 whereby said bevel gears 296 and 297 are constrained for rotation with said stub shaft sections 279 and 280. Additionally, the differential housing 299 has a pair of oppositely extending coaxially aligned extensions 300 which are disposed about opposite inner end portions 288 and 289 of stub shaft sections 279 and 280 and journalled in a pair of opposed non-friction bearing members 301 which are retained in any conventional manner in opposed bearing caps 292.

To transmit the torque of ring gear 277 to the stub shaft sections 279 and 280, the ring gear 277 is releasably secured to the differential housing 299 by tie means such as bolts 302 only one of which is shown and which extends through said differential housing and an internal annular web 335 of said ring gear 277, the securance being made fast by a lock nut means 303. Thereby, as the differential ring gear 277 rotates the differential housing is constrained for rotation therewith about an axis provided by the main drive shaft 333. To transmit torque from the differential to the main drive shaft 333, a double gear member generally designated 336 and having a supporting stem 304, which is fitted into a well or pocket 305 of the differential housing 299, is supported by said stem 304 between adjacent inner end stub shaft portions 288 and 289. The hub 306 of said double gear member 336 has integrally fashioned therewith or carries a pair of opposed gears 307 and 308 which are enmeshed with the opposite bevel gears 296 and 297. Accordingly, as the differential housing is rotated it carries the gears 307 and 308 therewith to transfer the torque thereof to the bevel gears 296 and 297 and thereby rotates the stub shaft sections 279 and 280 in the same direction simultaneously.

ADAPTER

The invention utilizes an adapter generally designated at 309 which is seen in FIGS. 3 and 4. Said adapter comprises a gear driven clutch member 310 having gear teeth 311 which are in continuous mesh with the gear 269. The clutch member 310 has a counterbore 312, as clearly illustrated in FIG. 6, in which there are disposed or suitably mounted anti-friction bearing means 313 by which the clutch member 310 is journalled on a medial projected portion of a stub shaft 314, the inner end portion of which is rigidly secured in a wall of the adapter casing or cover 315. As illustrated in FIGS. 3, 4 and 6, the adapter casing or cover has a mounting flange or boss 316 for securing said casing or cover to the transmission housing 218 by means such as bolts or cap screws or the like 317. As illustrated in FIG. 6, the clutch member 310 is retained from axial displacement on the stub shaft 314 by means of a retainer which may be a snap ring 318 which is mounted in a recess provided therefor in the free or outer end portion of the stub shaft 314. The snap ring bears against a washer 319 to hold the same against the outer face of the clutch member 310. The axial dimension of the clutch member 310 is such that it abuts a washer 337 which is disposed about the shaft 314 between said clutch member 310 and the wall of the casing or cover 315.

As illustrated in FIG. 3, a boss or extension of the housing of the fixed displacement pump 67 is fashioned as or carries a boss or mounting flange 320 which is secured against a rim 321 of the casing or cover 315 by means of suitable fasteners such as bolts or the like 322. The rim 321 defines an aperture 357 in the casing 315 into which an extension or portion 359 of the housing of the displacement pump 67 is projected in a snug fit to lend stability to the securance of and to align pump 67 with respect to the adapter casing 315. An extension 323 of the input shaft of said pump projects through the aperture 357 into the adapter housing 315 in coaxial alignment with the stub shaft 314.

As shown at 324 in FIG. 6, pump input shaft extension 323 is splined to provide means for constraining rotation therewith of a shiftable clutch member 325. The clutch member 325 is shiftable axially of said shaft extension 323 into and out of engagement with the clutch member 310 by means of a shifter fork or yoke 326 the opposite legs of which engage in opposite sides of a therefor provided annular groove 358 in said clutch member 325.

The shifter fork or yoke 326 has a body 327 from which there projects outwardly a dowel pin 328 which has one end portion secured by press fit or the like in said shifter fork body and an opposite end portion guidingly slidable in an aperture or bore 351 defined or provided in the wall of the housing 315. The shifter fork or yoke is reciprocative or movable by reason of a shifter rod 329 which is parallel to dowel 328 and which has an end portion 350 projected through the shifter fork body 327 and reciprocative in a well 352 provided in a wall of the adapter housing 315. The shifter rod 329 is secured to the shifter fork body 327 by means of a pin 343 which is releasably engaged in a transverse aperture 344 provided in the shifter rod 329 by projection through a bore 345 in said shifter fork body in which said pin 343 is disposed to lock the shifter rod and shifter fork 326 together. To facilitate withdrawal of the pin 343, an outer end portion thereof is fashioned as a screw 346 which threadingly engages in a threaded counterbore which is a coextension of the bore 345. The cap 347 of screw 346 impinges a washer 348 against the shifter body 327 when the pin 343 is projected fully into rod securing position.

As illustrated in FIG. 6, the shifter body 327 has a pair of recesses 353 to provide a pair of seats for a ball detent 349 of a detent mechanism to releasably lock the clutch 325 in each of its alternative selected positions. The construction of the detent mechanism is conventional and, accordingly, there is provided a compression spring 354 which is mounted in a well or aperture 355 provided in the adapter housing 315. One end of said spring bears against the ball detent 349 to bias the same toward seated position while the other end of said spring 354 bears against a spring tension adjusting threaded plug 356 mounted in the open threaded end portion of said well or aperture 355.

As illustrated in FIG. 2, the outwardly projecting end portion of the clutch shifter rod 329 is pivotally connected to one end portion of a link 330 as at 331. The opposite end portion of said link 330 is rigidly connected as at 332 to an end portion of the force transmission rod or link 47, earlier defined herein. Accordingly, it is seen that through operation of the shift stick 37, the clutch shifter rod 329 can be reciprocated to releasably engage the clutch member 325 with the clutch member 310.

MODE OF OPERATION

In normal operation of the vehicle 20, generally, only the change speed transmission 224 will be employed for driving. This may be done by conventional means which will selectively connect the transmission 224 and vehicle engine 36 to motivate the main drive shaft 333. Conventionally, the transmission 224 has a plurality of shiftable gears for conditioning vehicle 20 for several forward drives and a reverse.

However, should the operator of the vehicle anticipate undulating terrain surfaces or diverse surface supporting conditions, the operator may actuate his auxiliary hydraulic power transmission means by manipulating shift stick 37. When the shift stick 37 is selectively manually moved to the position for operation of the auxiliary wheels 29 as traction members, the gears 124 will be operated simultaneously by a linkage controlled by said shift stick 37 to mesh with the gears 121 and, accordingly, to drive each of the shafts 123 and the thereon carried pinions to rotate each internal ring gear 131 and the shafts 133 on which such ring gears are carried, thereby, to rotate each of the wheels 29, as clearly illustrated in FIG. 8. Simultaneously with such occurrence, and by reason of the linkage between the shift stick 37 and the shift rod 329 (which linkage is clearly seen in FIGS. 1 and 2), clutch member 325, which is the driven member of adapter 309, will be shifted into operative engagement with clutch member 310 which is the driving member of adapter 309 for rotation thereby.

Whether or not the clutch member 310 is rotating will depend upon the condition of the change speed transmission 224. That is to say, the clutch member 310 is continuously enmeshed with the gear 269. When gear 269 rotates, the clutch 310 will be rotated correspondingly. Now, the gear 269 will rotate when either forward drive torque is imposed thereon by gear 284 as a result of rotation of shaft 243 or reverse drive torque is imposed thereon as a result of rotation of shaft 262 by reason of meshing of gears 252 and 256. Accordingly, the clutch 310, which is adapted to be rotated in both directions of rotation about its axis provided by the shaft 314, will rotate in a manner which corresponds to the speed and the direction of rotation of the change speed transmission 224, and is adapted to rotate the clutch member 325 together with the input shaft extension 323 of pump 67 correspondingly.

As illustrated in FIG. 5, the pump 67 is reversible and thereby is adapted to drive hydraulic fluid through the motors 53 in opposite directions. That is to say, for one direction of rotation of pump 67, conduit 65 will be an utput conduit in which event conduit 66 would be a return conduit; and upon reversal of pump 67, conduit 66 would become the output conduit and conduit 65 the return conduit. In such regard, attention is invited to FIG. 3 in which it is seen that the housing of the pump 67 has secured thereto a fitting 342 which is secured to the housing of pump 67 by suitable fasteners such as bolts or the like 341. Said fitting 342 has a pair of apertures 339 and 340 which provide the means for connecting the pump ends of the conduit 65 and 66 to said pump.

The volume of fluid flow in the hydraulic system of motors 53 will depend upon the speed of rotation of the shaft 323 by reason of means within the pump 67 which are well known in the art; and understandably, the motors 53 will be driven at speeds corresponding to the flow generated in their hydraulic system as a consequence of rotation of the shaft extension 323. Moreover, not only is the flow of the fluid in the system thereby synchronized with the speeds of the change speed transmission, in the manner aforesaid, but also the direction of flow is governed by the direction of rotation of gear 269 and, accordingly, the direction of the motors 53 will be reversed upon reversal of direction of the gear assembly 310 which is journalled on shaft 314 and driven by gear teeth 311 which are meshed with said gear 269. It is appreciated, therefore, that the speed of the motors 53 as well as the direction of rotation thereof can be precisely synchronized with the speed and direction of drive of the change speed transmission 224.

Notwithstanding the operation of the auxiliary system, the wheels 29 will only become traction wheels when the main traction wheels cease to provide sufficient torque to propel the vehicle 20 because (as previously explained) the auxiliary hydraulic system is engineered in the manner such that the fluid flow produced therein will never develop a torque in the motors 53 when the main wheels are operating in normal traction condition. Since the rotation of the pump 67 corresponds to the speed and direction of rotation of the change speed transmission and since the fixed displacement pump 67 will displace a fixed volume of fluid per revolution although the fluid flow per unit of time and the pressure of the system will vary with the rotating speed, it is nevertheless obvious that the displacement of the pumps and motors are so designed or selected such that the torque delivered to the guide wheels 29 will be negligible when the traction wheels 28 have good traction. In this condition the guide wheels 29 will merely follow the traction wheels 28. However, if the traction wheels 28 begin to slip and lose traction, pressure in the auxiliary system will immediately increase since the pump 67 continues to rotate with the change speed transmission 218 to deliver a fixed displacement of fluid per revolution and motors 53 must also continue to rotate at the same speed. Torque is then developed in the guide wheels 29 and must increase since the guide wheels 29 are no longer being pulled but must now push the vehicle. Consequently it may be said that the power developed by the auxiliary power transmission system is in inverse proportion to the power produced by the change speed transmission delivered to the traction wheels 28. Therefore, while the main traction wheels 28 provide traction for the vehicle 20, even though the auxiliary system is "in," no traction will be derived from the wheels 29 and to such extent they are considered as following main traction wheels 28. However, should the traction force provided by the wheels 28 fall below the level necessary to propel the vehicle, such as when the device is skidding or the wheels 28 are slipping, then the auxiliary or steerable wheels 29 will become traction wheels.

HYDRAULIC SHIFT MECHANISM

An alternative manner of engaging and disengaging the hydraulic power distribution system of the present invention is disclosed in FIGS. 14, 15, 16 and 17. FIG. 14 discloses the adapter unit of FIG. 3 modified by a hydraulic shifting mechanism. With reference to FIG. 14 it will be observed that a shifter rail 600 is enclosed in a housing or chamber 601 adjacent adapter unit 309 and is reciprocable within said chamber in response to fluid pressure being delivered to port 602 or 603. Shifter fork 326 is rigidly attached to this shifter rail 600 at 327 and engages clutch member 325 for moving same into and out of engagement with clutch member 310. Thus as fluid is directed to either port 602 or 603 shifter rail 600 will be reciprocated so as to engage and disengage clutch member 325 with clutch member 310.

As to the specific details of the shifting mechanism the drawings disclose a slot 605 within said housing which provides space for the shifter rod 326 to operate. This slot may be formed by conventional casting methods or the housing 601 may be formed by two or more parts and then bolted together by bolts as disclosed at 607 and 608. A seal element 606 may be interposed within the housing 601 adjacent each end of the piston of shifter rod element 600. This cup-shaped member will prevent leakage of hydraulic fluid into the adapter housing. Additionally spring 609 may be placed against such sealing element in the end of the housing to insure that the sealing element 606 always maintains abutting contact with the piston.

It should also be obvious to one skilled in the art that shifter rail 147 which engages and disengages the gear member 24 of the torque transmission assembly (see FIGS. 8 and 12) may be enclosed in a housing and be controlled by hydraulic fluid acting upon either end of said shifter rail 147. As a result of incorporating the shifter rails in a chamber so as to be responsive to fluid pressure the mechanical linkage system disclosed in the first embodiment may be disposed of and the hydraulic actuator here described may be substituted therefor.

Alternative structure for delivering power from the motor 53 to the guide wheels 29 is disclosed in FIG. 17 which additionally discloses how the shifter rail 147 may be incorporated into a housing for hydraulic manipulation thereof. According to FIG. 17 the guide wheel 29 is coupled to the rear axle assembly 27 by a kingpin assembly 707 suitably journalled to yoke 708 which is directly attached to rear axle assembly 27. Mounted upon this kingpin assembly 707 is an annular frame member 706 which carries hydraulic motor 53 attached thereto by conventional means. Also structurally attached to this annular frame 706 is an adapter housing 705 which carries the shifter rail 147. Shifter rail 147 carries fork element 128 which controls the positioning of clutch member 701, clutch member 701 being laterally shiftable into and out of engagement with clutch element 702. As is well known clutch member 701 would be disposed upon a shaft which is driven by motor 53. Similarly clutch element 702 is attached to shaft 703 and constrained by rotation therewith within the housing, bearings 704 providing anti-friction means. The exterior end of shaft 703 carries a gear member 712 which drives a chain 710 which in turn drives a gear member 711. The gear member 711 is constrained for rotation with a shaft which drives guide wheel 29. The specific details of the shifter mechanism including shifter rail 147 may be similar to the shifter rail 600 disclosed in FIG. 14. Thus shifter rails 147 of each of the motors 53 and shifter rail 600 operating upon pump 67 may be actuated so as to engage the clutch members by a hydraulic control circuit.

The hydraulic control circuit for the actuator is disclosed in FIG. 15 while both the hydraulic control circuit and the fluid power circuit is disclosed in FIG. 16. Fluid pressure is delivered from the conventional hydraulic system of the vehicle through fluid conduit 540 to a two position, four-way, directional control valve indicated at 550. To engage the clutch elements of the torque transmission assemblies 52 and the pump 67, the hydraulic valve 550 is shifted to the left at which time hydraulic fluid from the hydraulic system is delivered into conduit 555 and through conduits 556, 557 and 558 to move the corresponding shifter rails such that the clutch mechanisms will become engaged with their associated counterpart. As long as valve 550 is shifted to the left fluid pressure will be delivered to the shifter rails 600 and 147, 147. A detent mechanism such as that disclosed by elements 152 through 156 in FIG. 12 may be used to provide additional force holding these clutch members engaged. Once all clutch members are engaged fluid is displaced through conduit 500 from the pump 67 to conduits 501 and 502 to drive the motors 53 and fluid will be returned from the motors via conduits 511, 512, and 510. Between the conduits 500 and 510 which connect motors 53 to pump 67 are interposed two check and relief valves. The relief valves 68, 69 operate to relieve excess pressure in either the power or return side of the fluid power circuit, while the check valves 63, 64 open to permit fluid flow into the system when the pressure in either conduit diminishes below a given minimum level. This minimum level may be the filter back pressure, since return fluid from valve 550 and from the primary combine return circuit 563 must pass through filter 561 to reach reservoir 562.

MODE OF OPERATION

The hydraulic power distributive system may be quite easily engaged and disengaged by this control circuit. For example, assuming that the operator desires to engage his power distribution circuit he merely shifts the directional flow control spool of valve 550 to the left and hydraulic pressure will bear against shift rails 147 of the torque transmission assemblies and shifter rail 600 in such a manner as to shift the clutch members of both the pump and the torque transmission assemblies into engagement with the correlative clutch member. Should the dogs on the clutch members fail to engage immediately, the circuit will maintain the pressure until the dogs mesh, at which time, engagement will occur.

As soon as at least one of the clutch members is engaged fluid flow will be created between the pump 67 and the motors 53 and as soon as all of the clutch members become engaged due to the continuing pressure against the shifter rails fluid power will be delivered from the pump motor as determined by the terrain conditions and the center of gravity of the vehicle. In the event that the operator of the vehicle ascertains that such auxiliary drive is no longer needed he may merely shift the spool of valve 550 to the right thereby disengaging the clutch members of the pump and associated motors of the guide wheels. Such will be effective to disengage these clutch members and the vehicle will be operated without auxiliary drive.

Applicants, in this application, have disclosed a unique and novel hydraulic power distribution system for an agricultural vehicle. This system is so proportioned that power may be delivered from the change speed transmission to the guide wheels only as needed to obtain optimum torque. Further unique control mechanisms have been disclosed for engaging and disengaging this system from operation. Our invention is capable of maintaining an ideal optimum torque output so as to enable a vehicle to operate most favorably under all terrain conditions and surface conditions. This unique invention is ideally adapted to agricultural vehicles having large main traction wheels and smaller guiding wheels and to vehicles in which the center of gravity will vary depending upon the load to be carried or dependent upon undulations of the terrain. By proper proportioning of the hydraulic power system we have disclosed a unique ssytem which produces optimum torque and maximum propulsion at all times.

As this invention may be embodied in several forms without departing from the spirit or essential characteristics thereof. The present embodiment is therefore illustrative and not restrictive.

We claim:
1. In a vehicle having a frame, a pair of principal traction wheels and a pair of guiding wheels supporting said frame, power producing means for driving said wheels, a change speed power transmission having a reversibly driven output shaft, said change speed power transmission connected to said power producing means for transmitting power to drive said principal traction wheels, the improvement comprising:
   (a) reversible hydraulic pump,
   (b) adapter means for operably connecting said hydraulic pump to said change speed transmission,
   (c) hydraulic motors operably connected to each of said guiding wheels,
   (d) torque transmission assemblies for receiving power from said hydraulic motors and for delivering torque to said guiding wheels,
   (e) a closed hydraulic power circuit including means for circulating fluid between the pump and motors when the pump and motors have been actuated and the circuit is operating under normal operating pressures.
   (f) clutch mechanisms interposed between the hydraulic pump and the change speed transmission and between the hydraulic motors and the torque transmission assemblies, said hydraulic pump and said hydraulic motors having such a fixed correlative displacement as to drive all of the wheels at substantially the same linear peripheral velocity.

2. An apparatus as defined in claim 1 in which said clutch mechanisms comprises:
   (a) clutch members operably associated with the hydraulic pump and with the torque transmission assemblies,
   (b) a shifter and shifter rail connected to said clutch members,
   (c) a housing for said shifter rails,
   (d) hydraulic circuit means for delivering fluid pressure to alternative ends of said shifter rails to engage and disengage said clutch mechanisms.

3. An apparatus as defined in claim 1 in which said clutch mechanisms comprises:
   (a) a clutch member,
   (b) a shifter fork and shifter rail operably attached to said clutch member,
   (c) a mechanical linkage system attached to said shifter rails for manually shifting said shifter rails for selective engagement and disengagement of said clutch means.

4. In a vehicle having a frame, a pair of main traction wheels and a pair of guiding wheels supporting said frame, power producing means for propelling said vehicle, and power transmission means including a reversible change speed transmission for translating power from said power producing means into drive applied to said main traction wheels, the combination comprising: hydraulic drive transmission means operable for driving said guiding wheels and including a reversible hydraulic pump; adapter means mounting said pump on said change speed transmission; clutch means mounted in part on said change speed transmission and in part on said hydraulic pump and engageable for transmitting drive from said change speed transmission to said hydraulic pump at the speed and in the direction at which said change speed transmission is being operated; said hydraulic drive transmission means including interconnected hydraulic motor means, gear means operably connected thereto and drive disconnect means engageable for drivingly connecting said gear means to said guiding wheels; manually operable linkage means interconnecting said clutch means and said drive disconnect means and operable so as to effect substantially simultaneous engagement of said clutch means and said drive disconnect means.

5. In a vehicle having a frame, a pair of main traction wheels and a pair of guiding wheels supporting said frame, power producing means for propelling said vehicle, power transmission means including a reversible change speed transmission for translating power from said power producing means into drive applied to said main traction wheels, and hydraulic drive transmission means operable for driving said guiding wheels and including a reversible hydraulic pump and interconnected hydraulic motor means, the improvement comprising: adapter means mounted in part on said change speed transmission and in part on said hydraulic pump and disposed therebetween and including a clutch means engageable for transmitting drive from said change speed transmission to said hydraulic pump at the speed and in the direction said change speed transmission is being operated; gear means operably connected with said hydraulic motor means; clutch means disposed between said gear means and said guiding wheels and engageable for drivingly connecting said motor means to said guiding wheels; manually operable linkage mechanism interconnecting both said clutch means and operable for effecting engagement of both said clutch means at the same time.

6. In combination with a pair of drive means for applying force against a common load to cause movement of the load, power producing means; power transmission means for translating power from said power producing means into power applied to a first of said drive means; power distributing means including a clutch drivingly engageable with said power transmission means, a positive displacement hydraulic pump drivable by said power transmission means upon engagement thereof by said clutch for transmitting power to a second of said drive means, and fixed displacement hydraulic motor means hydraulically connected with said pump for driving the second of said drive means and including shiftable means for selectively engaging said hydraulic motor means into driving relation with the second of said drive means; manually operable means for simultaneously shifting said shiftable means into engagement with said hydraulic motor means and said clutch into engagement with said power transmission means; and having said power distributing means proportioned and arranged so that normally the power translated from the power producing means is effectively applied to said first drive means and upon a reduction in the effectiveness of the power applied to said first drive means to a value less than that required to move the load the power applied to said second drive means through said power distributing means is thereupon effective for movement of the load.

7. In a vehicle having a frame, a pair of principal traction wheels and a pair of vehicle guiding wheels supporting said frame, power producing means for driving said wheels and a reversible change speed power transmission connected to said power producing means for translating power therefrom into power applied to drive said principal traction wheels, the improvement comprising: power take-off means driven by said power transmission comprising a shaft including a gear disposed in driven relation with said transmission and constrained for rotation therewith in the direction and at the speed thereof; a fixed displacement reversible hydraulic pump having an input member operable for driving said pump; a clutch element drivingly connected to said input member; a clutch member mounted on said shaft and constrained for rotation with said gear and selectively engageable with said clutch member for driving said pump; hydraulic wheel driving means including a pair of fixed displacement reversible and interconnected hydraulic motors hydraulically connected to said pump, and a pair of clutch-like components mounted for selective engagement one each with a respective one of said motors and constrained for rotation with respective ones of said guiding wheels, and interconnected linkage mechanism operative for simultaneously engaging said clutch member with said clutch element and for conditioning said clutch-like components into engagement with respective ones of said motors for selectively transferring power received through said power transmission to said vehicle guiding wheels; said hydraulic wheel driving means being proportioned and arranged so that power transmitted to said guiding wheels will only produce tractive effect therefrom for moving the vehicle to the extent that the tractive effect resulting from the power applied to the principal traction wheels falls below the tractive effect resulting from the power applied to said vehicle guiding wheels.

8. In an agricultural vehicle and the like having a frame, a pair of main traction wheels and a pair of guiding wheels supporting said frame, power producing means for driving said wheels, reversible change speed power transmission means for translating power from said power producing means into power applied to said main traction wheels, and hydraulically drivable drive transmission means for operation of said guiding wheels, the improvement of an adapter for translating power from said power transmission means into power for driving said hydraulically drivable drive transmission means and comprising a fixed displacement reversible variable speed pump for hydraulically driving said drive transmission means and having an input component; a clutch component mounted on said input component and constrained for rotation therewith; gear means operably driven by and at the speed and in the direction of said power transmission means; a shaft member on which said gear means is mounted for rotation; a clutch component mounted on said shaft member and constrained for rotation with said gear means; clutch-like means constrained for rotation with said guiding wheels and engageable with said drive transmission means for selectively receiving power for said guiding wheels from the power transmission means; manually operable means for effecting engagement of the clutch mechanisms including a manually shiftable member, a crank-like structure operably connected to said shiftable member and rockable thereby, a pair of shifting rods connected to said crank-like structure and disposed substantially normally to each other, one of said rods being adapted for causing engagement of said clutch member and said clutch component, the other of said rods adapted for causing engagement of said clutch-like means with said drive transmission means whereby the guiding wheels are conditioned for rotation simultaneously with transmission of power from said power transmission means to said drive transmission means.

9. In a vehicle having a frame, a pair of principal traction wheels and a pair of guiding wheels supporting said frame, power producing means for driving the wheels, a reversible change speed power transmission connected to said power producing means, said change speed power transmission having an output shaft means connecting said output shaft to said principal traction wheels, the improvement comprising:
a hydraulic power distribution system including:
a reversible hydraulic pump connected to the output shaft of said change speed transmission,
hydraulic motors,
a closed hydraulic power circuit including means for circulating fluid between the pump and motors when the pump and motors have been actuated and the circuit is operating under normal operating pressures,
torque transmission assemblies interposed between said hydraulic motors and said guiding wheels for transferring torque from said motors to said guiding wheels,
clutch actuating means interposed between said change speed transmission and said hydraulic pump for permitting selective engagement and disengagement of the hydraulic power distribution system,
separate clutch means interposed between said hydraulic motors and the respective torque transmission assemblies,
and wherein said hydraulic pump and said hydraulic motors including means providing a correlative displacement such as to drive the guiding wheels at substantially the same linear peripheral velocity as that of the main traction wheels.

References Cited

UNITED STATES PATENTS

| 3,053,043 | 9/1962 | Knowler. | |
| 3,191,708 | 6/1965 | Simonds et al. | 180—44 |
| 3,246,715 | 4/1966 | Pool et al. | 180—70 X |
| 3,272,279 | 9/1966 | Budzich | 180—66 X |
| 3,320,829 | 5/1967 | Cull | 180—66 X |

FOREIGN PATENTS

| 1,285,089 | 1/1962 | France. |
| 142,541 | 1961 | U.S.S.R. |

A. HARRY LEVY, Primary Examiner

U.S. Cl. X.R.

180—43, 53, 55, 66, 70, 75, 79.2